United States Patent
Horigami et al.

(10) Patent No.: US 6,758,756 B1
(45) Date of Patent: Jul. 6, 2004

(54) METHOD OF CONTROLLING VIDEO GAME, VIDEO GAME DEVICE, AND MEDIUM RECORDING VIDEO GAME PROGRAM

(75) Inventors: Atsushi Horigami, Tokyo (JP); Satoshi Shimo, Tokyo (JP); Chiaki Nakanishi, Tokyo (JP); Yoshimasa Hagiwara, Tokyo (JP); Eriko Yamada, Tokyo (JP); Naomitsu Tsugiiwa, Tokyo (JP); Masafumi Kamio, Tokyo (JP); Yukiko Daitoku, Tokyo (JP); Ryo Kato, Tokyo (JP); Masayuki Takahashi, Tokyo (JP)

(73) Assignee: Konami Co., Ltd., Hyogo (JP)

( * ) Notice: Subject to any disclaimer, the term of this patent is extended or adjusted under 35 U.S.C. 154(b) by 0 days.

(21) Appl. No.: 09/355,965

(22) PCT Filed: Dec. 18, 1998

(86) PCT No.: PCT/JP98/05752

§ 371 (c)(1),
(2), (4) Date: Dec. 3, 1999

(87) PCT Pub. No.: WO99/32200

PCT Pub. Date: Jul. 1, 1999

(30) Foreign Application Priority Data

Dec. 19, 1997 (JP) .............................. 9/351501

(51) Int. Cl.[7] .......................... A63F 13/00; A63F 9/24; G06F 17/00; G06F 19/00

(52) U.S. Cl. ............................. 463/43; 463/1; 463/30; 463/31; 463/36; 463/37; 434/307 A; 434/308; 700/90; 700/91; 700/92

(58) Field of Search ........................... 463/43, 32, 1–5, 463/30, 34, 31, 33, 35, 36, 40; 434/307 R, 308, 307 A, 309, 323, 327; 700/90, 91, 92, 94

(56) References Cited

U.S. PATENT DOCUMENTS

| | | | | |
|---|---|---|---|---|
| 4,490,810 A | * | 12/1984 | Hon | 364/900 |
| 4,634,386 A | * | 1/1987 | Tamaki | 434/323 |
| 4,637,799 A | * | 1/1987 | Bouchal | 434/236 |
| 4,694,723 A | * | 9/1987 | Shinohara et al. | 84/1.03 |
| 4,712,180 A | * | 12/1987 | Fujiyama et al. | 364/419 |
| RE33,662 E | * | 8/1991 | Blair et al. | 364/410 |
| 5,250,745 A | * | 10/1993 | Tsumura | 84/603 |
| 5,377,997 A | * | 1/1995 | Wilden et al. | 273/434 |
| 5,393,073 A | * | 2/1995 | Best | 273/434 |
| 5,408,914 A | * | 4/1995 | Breitweiser, Jr. et al. | 84/477 R |
| 5,464,946 A | * | 11/1995 | Lewis | 84/609 |
| 5,481,509 A | * | 1/1996 | Knowles | 369/30 |
| 5,484,291 A | * | 1/1996 | Nakai et al. | 434/307 A |
| 5,489,103 A | * | 2/1996 | Okamoto | 273/433 |
| 5,513,129 A | * | 4/1996 | Bolas et al. | 703/13 |
| 5,613,909 A | * | 3/1997 | Stelovsky | 463/1 |
| 5,782,692 A | * | 7/1998 | Stelovsky | 463/1 |
| 5,880,731 A | * | 3/1999 | Liles et al. | 345/349 |
| 5,977,968 A | * | 11/1999 | Le Blanc | 345/339 |
| 5,982,352 A | * | 11/1999 | Pryor | 345/156 |
| 6,001,013 A | * | 12/1999 | Ota | 463/7 |
| 6,008,800 A | * | 12/1999 | Pryor | 345/173 |
| 6,045,447 A | * | 4/2000 | Yoshizawa et al. | 463/31 |

FOREIGN PATENT DOCUMENTS

JP 10/99546 A 4/1998

* cited by examiner

Primary Examiner—Teresa Walberg
Assistant Examiner—Binh-An D. Nguyen
(74) Attorney, Agent, or Firm—Lowe Hauptman Gilman & Berner, LLP

(57) ABSTRACT

The present invention relates to a method for controlling a novel video game in which dancing is used as a factor in the behavior of a character, a machine for the video game, and a medium in which a program for the video game is recorded, and makes it possible to dance characters 611 and 612 displayed using 3-D polygons in time with music, to evaluate their dance skills based mainly on whether dance actions are in time with the music, and to proceed with a story by winning matches with a computer or to match with other players.

33 Claims, 39 Drawing Sheets

FIG. 13

| LIST OF CHARGES | | |
|---|---|---|
| JAPAN ⇨ LONDON | $ 1000 | |
| NEWYORK | $ 1000 | |
| SYDNEY | $ 500 | |

Tabs: PARAMETERS / MEMORIES / COMMANDS / LIST OF CHARGES

FIG. 15

| NAMES | COMMANDS |
|---|---|
| ARM WAVE | □ △ ○ |
| BACKSPIN | ○ × ↓ ← ↑ → |
| HEADSPIN | ○ △ ↓ ← ↑ → |
| TWISTER STEP | ← → □ □ |
| MONKEY STUNT | ↓ ○ |
| SPIRAL TURN | → ↓ → |
| SMOOTH MOVE | ○ ○ ○ |
| LEAP | ↑ ↑ × |
| TWIST | □ ○ □ ○ |
| SHUFFLE STEP | ○ × □ ○ × □ |

TWISTER STEP
STEP SO THAT TOES DRAW A CIRCLE, WHILE LETTING HANDS BEING ALONG THE BODY.

MONKEY STUNT
BEND AND STRETCH, WHILE CROSSING LEGS AND ARMES, ALTERNATELY.

SPIRAL TURN
WHILE KEEPING ARMS HORIZONTALLY, AND USING ONE LEFT LEG TO KEEP BALANCE, PERFORM ONE BIG TURN TO THE RIGHT.

SMOOTH MOVE
PERFORM HANDCLAPS, WHILE MOVING THE BODY SMOOTHLY.

FIG. 23

```
              FREE DANCE MODE

MODE SELECT  ▷ 1 PLAY MODE
     SUBARU   ◁     CHARA        ▷   HITOMI
                    STAGE        ▷   LONDON
     120sec   ◁     TIME
                    SOUND        ▷   NO2
     HARD     ◁     LEVEL
                    COMMAND
                 MOVIE STUDIO
                    START
```

FIG. 25

| | COMMAND | | | |
|---|---|---|---|---|
| 1player | | | 2player | |
| NAME | COMMAND | | NAME | COMMAND |
| TWIST | □○□○ | | TWIST | □○□○ |
| TWISTER STEP | →→□□ | | MONKEY STUNT | ↓○ |
| MONKEY STUNT | ↓○ | | | |
| | | | | |
| | | | | |
| | | | | |
| | | | | |
| | | | | |

←——→ INTERVAL REGARDED AS RHYTHM

◄─────────► PEAK CHANGE INTERVAL PREDICTED AS TEMPO OF GENERAL MUSIC
◄─ ─ ─ ─ ─ ─► PEAK CHANGE INTERVAL NOT REGARDED AS TEMPO

METHOD OF CONTROLLING VIDEO GAME, VIDEO GAME DEVICE, AND MEDIUM RECORDING VIDEO GAME PROGRAM

TECHNICAL FIELD

The present invention relates to methods for controlling video games designed so that a player determines the behavior of a character on a video screen, in which the behavior itself, or effects caused by the behavior, or both, are displayed on the video screen so as to provide the player with a virtual experience, machines for the video games, and media in which programs for the games are recorded.

BACKGROUND ART

Conventional games of this type include: action games in which a character on a video screen overcomes obstacles and defeats opponent characters in order to reach a predetermined goal in accordance with commands input by a player operating a controller provided with keys; fighting games in which, by making various attacks, the life points (HP) of an opponent character operated by another player or by the computer are reduced to zero so that the opponent character is defeated; adventure games in which any of the commands displayed on a screen is selected, and the story or ending varies in accordance with the selection; role-playing games in which field shifting, battle with opponent characters, etc., are repeatedly performed, whereby a character is developed so that clearing an event is the goal; simulation games for measuring an ability of a player as an airplane pilot, a military commander, a head of a city, etc., or competing with another player or the computer; and various types of games in which the above factors are appropriately combined.

DISCLOSURE OF INVENTION

As described above, various types of video games have been proposed and realized. Currently, new video games are in continuing demand.

It is an object of the present invention to provide a method for controlling a video game in which dancing is introduced as a factor in the behavior of a character, a machine for the video game, and a medium in which the program of the video game is recorded.

According to the present invention, in order that the foregoing object may be achieved, in a method for controlling a video game designed so that a player determines the behavior of a character on a video screen, and the behavior itself, or effects caused by the behavior, or both are displayed on the video screen so as to be enjoyed as virtual experience of the player, a dance performed in time with music is used as a behavioral factor determined by said player, and an evaluation of the dance is presented to said player.

Accordingly, the player can enjoy the dance of the character and the evaluation of it as the player's virtual experience. In addition, by controlling the progress of the game in accordance with the evaluation of the dance, the player can enjoy not only the dance but also other factors such as the progress of the story in an adventure game and the entrance of a hiding character.

Here, by combining plural-type short dances (actions), which are executed when predetermined dance commands are input, to form the dance, various dances in accordance with operations by the player can be performed by the character.

It is basically appropriate to evaluate the dance based on whether dance command inputting is in time with the rhythm of music. When command inputting fails, or no command inputting is performed for a predetermined interval or more, the character flashes. When the inputting of a command having a high level of difficulty succeeds, successive actions succeed, a composite action is performed, no failure in command inputting is detected for not less than predetermined time, and the connection between actions is preferable, an additional score is given, whereby interest as to operating can be enhanced.

In addition, by using music recorded on an ordinary music CD as dance music, the character can be danced in time with music of the player's preference, and dance scenes are edited to form video clips.

BRIEF DESCRIPTION OF THE DRAWINGS

FIG. 13 is a drawing showing one example of a charge list screen;

FIG. 15 is a table showing specific dance commands;

FIG. 23 is a drawing showing one example of a menu screen in the Free-Dance Mode;

FIG. 25 is a drawing showing one example of a command list screen;

BEST MODE FOR CARRYING OUT THE INVENTION

Figure 1:
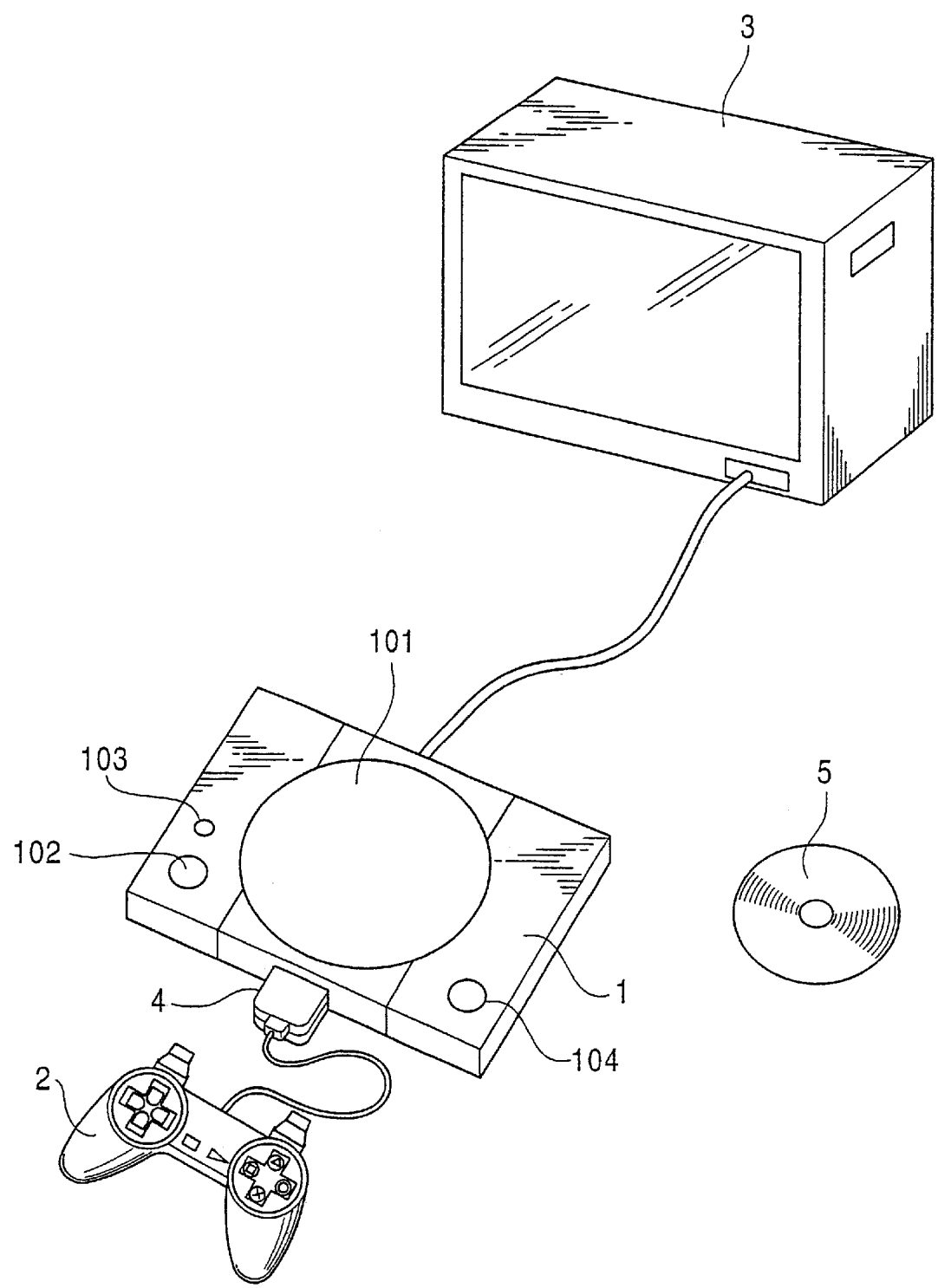
FIG. 1 is an outline view showing a video game machine for realizing a video game according to the present invention.

FIG. 1 shows a video game system for realizing a video game according to the present invention, and particularly shows an outline of a home video game system. FIG. 1 shows a game machine 1; a controller 2 for inputting various commands, which is connected to the game machine 1; a monitor 3 such as a television for outputting a game screen and music, which is connected to the game machine 1; an external storage device 4 for storing saved game data, etc., which is set in the game machine 1, or a memory card (as is the case here); and a medium 5 recording a game program executable by the game machine 1, or a CD-ROM (as is the case here).

The CD-ROM 5 is loaded into a CD-ROM drive (not shown) having a loading flip-up cover 101 on the top surface of the game machine 1, and its game program and data are read. The game machine 1 includes: a power-supply switch 102; a reset switch 103; and a flip-up button 104 for the flip-up cover 101.

Figure 2:
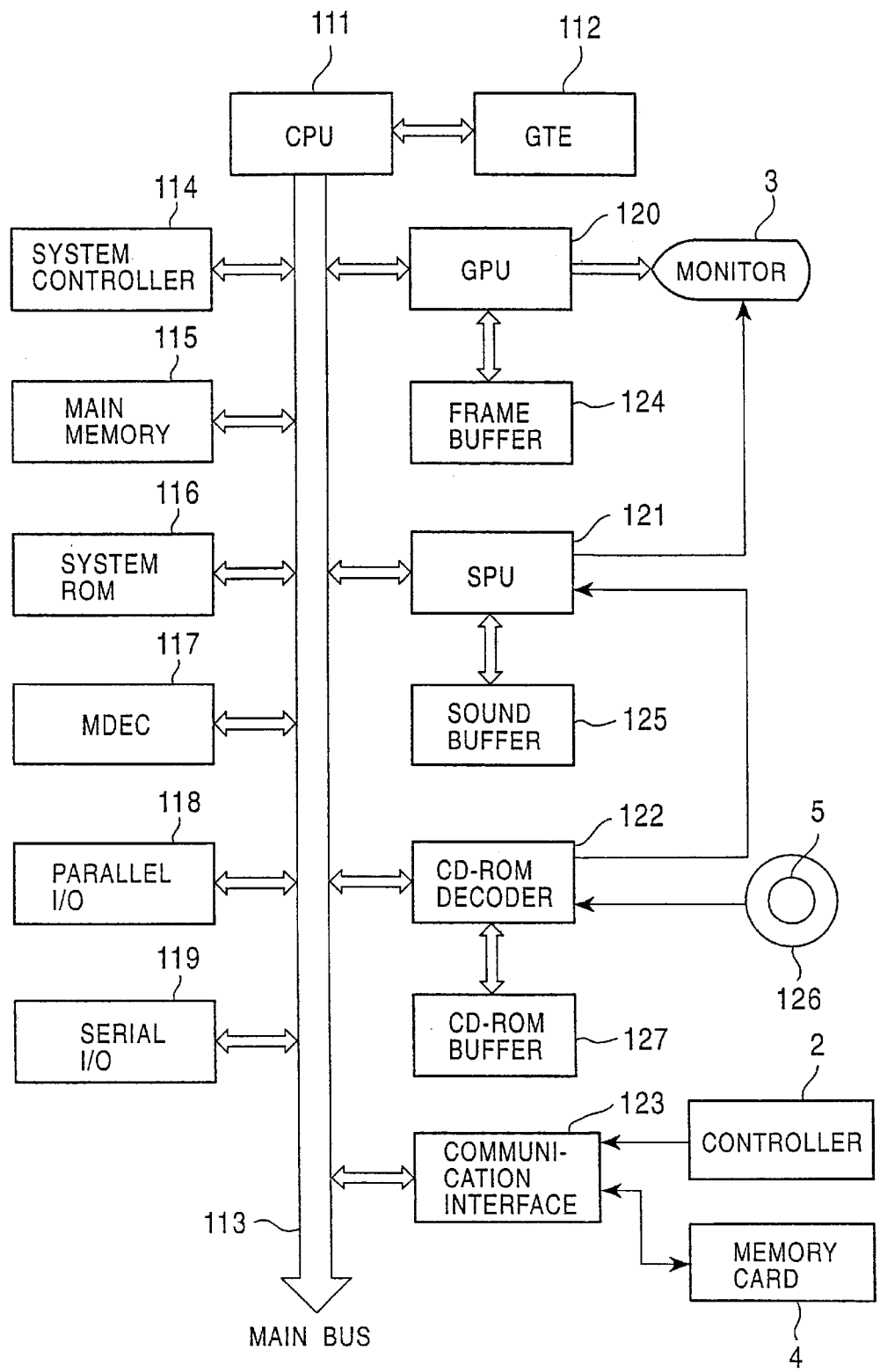
FIG. 2 is an internal block diagram showing a game machine.

FIG. 2 shows the detailed internal circuit structure of the game machine 1. The game machine 1 includes: a central processing unit (CPU) 111; an image-data generating processor (GTE) 112 directly connected to the CPU 111; a system controller 114 connected to the CPU 111 via a main bus 113; a main memory 115; a system ROM 116; an image-data decompression decoder (MDEC) 117; a parallel interface (I/O) 118; an image processor (GPU) 120; a sound processor (SPU) 121; a CD-ROM decoder 122; a communication interface 123; a frame buffer 124 connected to the image processor 120; a sound buffer 125 connected to the sound processor 121; and a CD-ROM driver 126 and a CD-ROM buffer 127 that are connected to the CD-ROM decoder 122.

The image-data generating processor 112 carries out large-scale data operations such as coordinate transformation and ray tracing computation, based on instructions from the CPU 111. The system controller 114 performs interruption control, memory access control, etc. The system ROM 116 stores a basic program, etc. The image-data decompression decoder 117 decodes image data compressed and encoded based on the MPEG or JPEG, etc.

In accordance with an instruction from the CPU 111, the image processor 120 uses the frame buffer 124 to generate game-screen video signals, and outputs them to a monitor 3. In accordance with an instruction from the CPU 111, the sound processor 121 uses the sound buffer 125 to generate sound signals including background music and background sounds, and outputs them to the monitor 3 (or another audio system, etc.).

The CD-ROM decoder 122 reads through the CD-ROM drive 126 programs and data recorded in the form of error-corrected codes on the CD-ROM 5, and stores them once in the CD-ROM buffer 127. It then decodes them into the original programs and data.

The communication interface 123 exchanges various signals and data with the controller 2 and the memory card 4.

Figure 3:
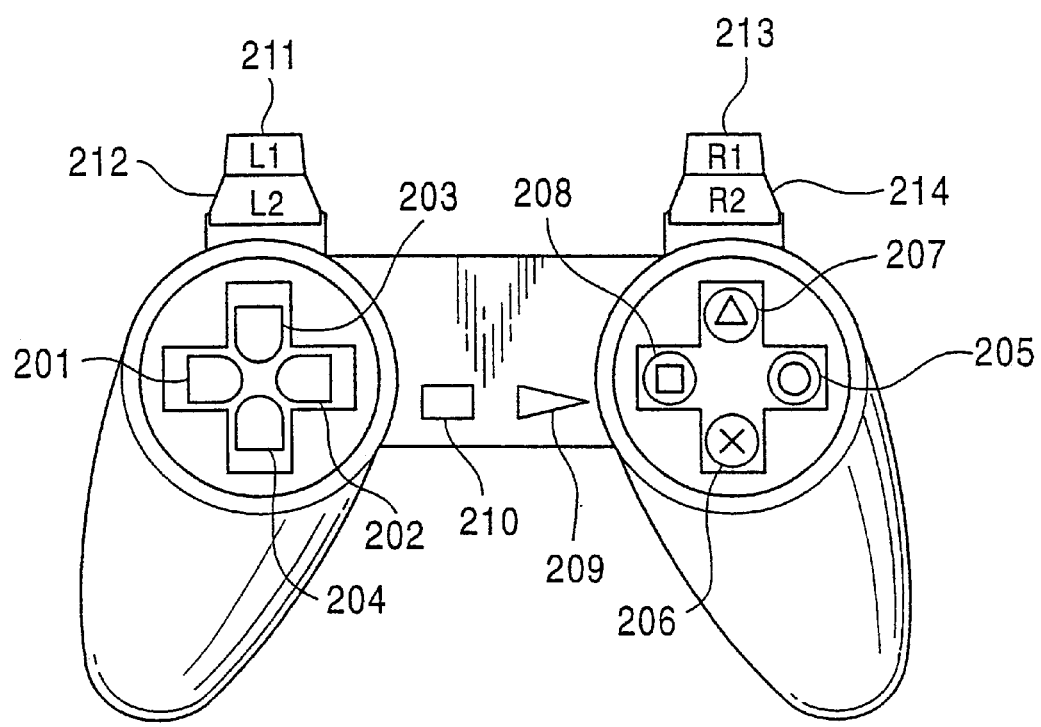
FIG. 3 is a view showing one example of a controller.

FIG. 3 shows one example of the controller 2. Operation keys 201 to 214 are used to input various commands. The keys 201 to 204 are used as left, right, upper, and lower direction keys to move a character and to select an item from a menu. The key 205 is used as a determination button, the key 206 is used as a cancel button, the key 207 is used as a menu-display button, and the key 209 is used as a start/pause button except when they are used in the Dancing Part described below. In the Dancing Part, the keys 201 to 208 are used to input dance commands, and the keys 211 and 213 are used as camera-perspective-changing keys. (In this game, the keys 210, 212, and 214, are not used.)

Figure 4:
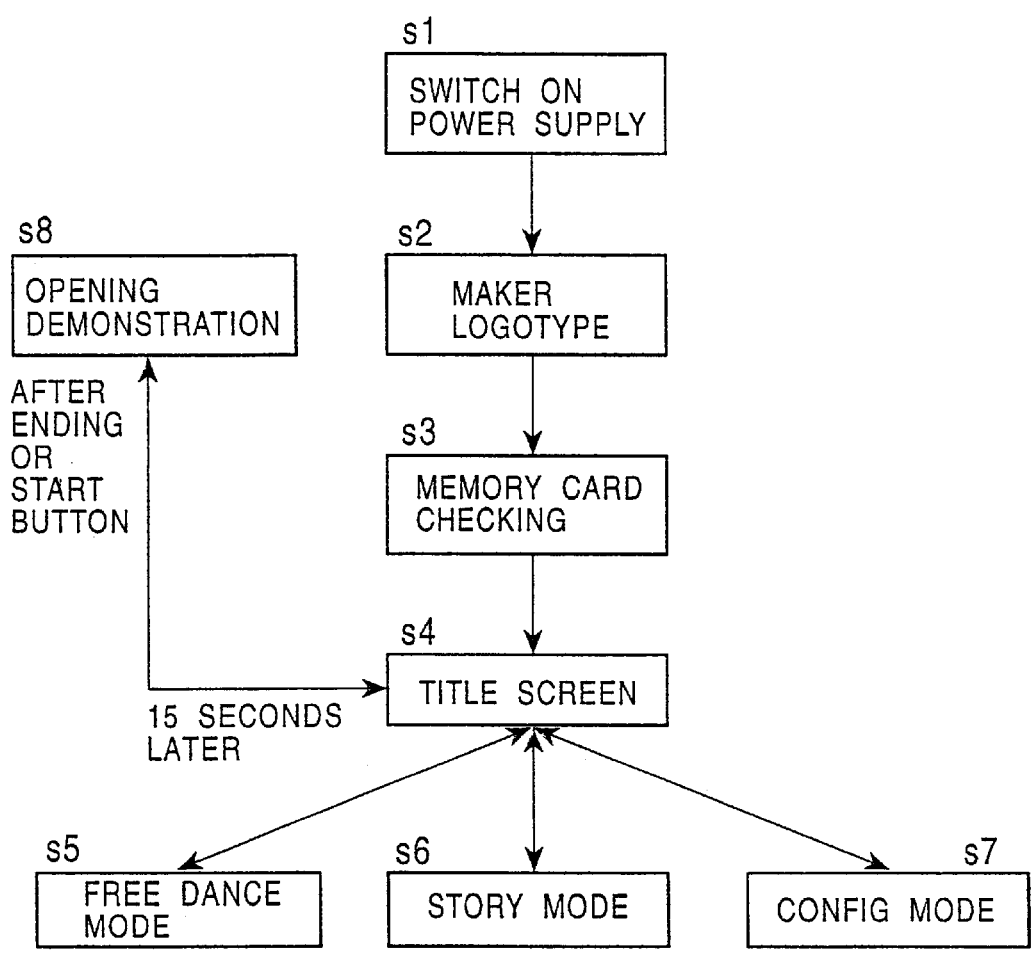
FIG. 4 is a flowchart of screen transitions showing the flow of a game system according to the present invention.

FIG. 4 shows the flow of events in a game system according to the present invention, using transitions of a screen.

When the CD-ROM 5 with the game program recorded thereon is set in the game machine 1, and the power-supply switch 102 is turned on (s1), an initial screen (maker logotype indication) is displayed (s2), and the memory card 4 is checked (s3) before a title screen is displayed (s4). In the memory card checking, information about characters and actions capable of being used in the Free Dance Mode described below is loaded.

A menu for selecting the "Story Mode", the "Free dance model", or the "Config Mode" is displayed on the title screen, on which, by operating the direction keys 201 to 204 of the controller 2 so as to select any one mode, and operating the determination button, transfer to the selected mode is performed (s5, s6, and s7). In the case where no operation is performed for a given interval (e.g., 15 seconds) while the title screen is being displayed, an opening demonstration may automatically be started (s8) (Return to the title screen is performed by the end of the demonstration or the operation of the start button, etc.).

The "Story Mode" is such that a player manipulates one leading character (for example, a girl) to have dance matches with rival characters throughout the world, and this mode is broadly divided into two parts: the "Adventure Part", and the "Dancing Part". In the Adventure Part, in accordance with a story, moving in fields, experiencing various events, and searching for commands to be used in the Dancing Part, are performed. The Dancing Part corresponds to an event in the Adventure Part, in which the leading character has dance matches with many rival characters, and masters a new dance by dancing with a character to become an instructor.

Referring to the Adventure Part for more details, for example, the leading character practices and masters a first dance in a home city in Japan, and then has dance matches with rival characters throughout Japan. Winning the matches allows the leading character to go to cities in countries around the world. The cities have dances representing the countries. Accordingly, the leading character has dance matches with rival characters who are masters of the dances, and if she defeats all the rival characters, the story ends. In each city, there is a character to become an instructor who teaches a dance representing each country. The leading character is allowed to use the dance if the instructor instructed her in the dance, and "passed" her. A dance, performed by the leading character in a match with a rival character, does not need to be a dance for each city, but any one of the dances that have been mastered (can be danced) may be performed.

The "Free Dance Mode" is designed so that the Dancing Part in the "Story Mode" can be enjoyed as a pure action game under various rules. This mode includes: the "Free Mode" (corresponding to matches with rival characters in the Story Mode) in which one freely combines dances by oneself to aim for high scores; and the "Trace Mode" (corresponding to matches with characters to become instructors in the Story Mode). Each mode further has three play modes: the "1 PLAY MODE", the "VS COM MODE (versus-computer battle)", and the "2 PLAY MODE (battle against another player)". In addition, dancing in time with commercial CD music, and the making of video clips by saving one's dance in the memory card, are possible.

The "Config Mode" performs various setting such as data loading, and sound switching (stereo/monophony).

Figure 5:
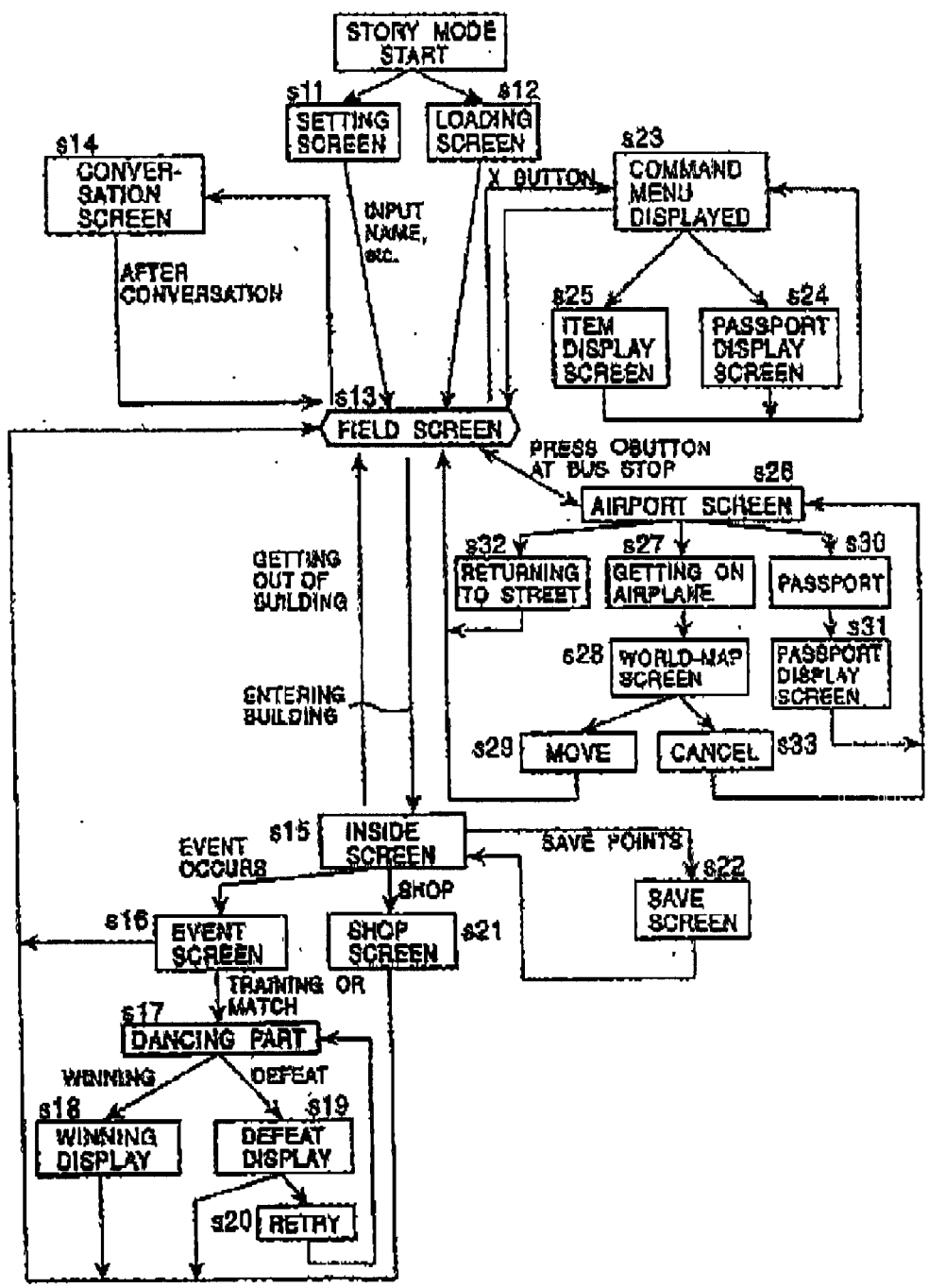
FIG. 5 is a flowchart of screen transitions showing the flow of the Story Mode in a game system according to the present invention.

FIG. 5 shows the flow of events in a game system according to the present invention using screen transitions.

When the Story Mode is selected, it is necessary that starting a new game (NEW GAME), or using saved data to start a game from an intermediate stage (CONTINUE) selected by using an operation similar to that described above. Selecting the starting of a new game displays a setting screen (name-input screen), while selecting the starting from an intermediate stage displays a loading screen (s11, s12). By inputting on the setting screen the name of a leading character before determining it, or selecting any one of ordinarily plural saved data before determining (loading) it, transfer to the first field screen or a field screen (shifting screen) obtained at the point of saving is performed (s13), and the Adventure Part starts.

A player (leading) character has the following parameters. In the Story Mode, the NEW GAME case sets default values (initial values) as the parameters, and the CONTINUE case sets values of the saved data as the parameters.

Money: represents one's own money. The units are in dollars ($), and the value range is 0 to 65535.
Physical Strength: represents endurance. The value range is 0 to 255.
Instantaneous Power: represents swiftness. The value range is 0 to 255.
Willpower: affects the condition of dancing. The value range is 0 to 255.
Luck: affects random factors in the game and the condition of dancing. The value range is −128 to 127.

Figure 6:
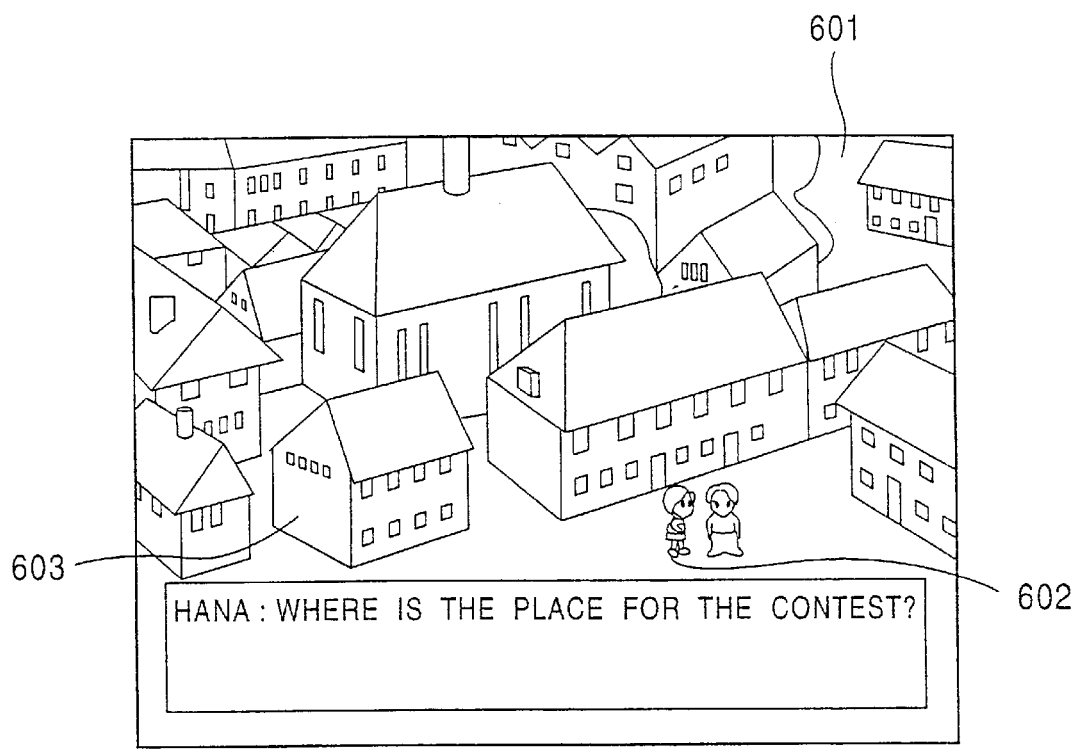
FIG. 6 is a drawing showing one example of a field screen.

FIG. 6 shows one example of a field screen, which includes a street 601 and a character 602 that are ordinarily displayed using two-dimensional (2-D) graphics. Operating the direction keys 201 to 204 allows the player character to move in eight directions (including four diagonal directions obtained when two adjacent direction keys are simultaneously pressed). The player character can meet and converse with a person walking in the street (s14), and can inspect a suspicious place, or can enter the inside of a building 603 (s15).

At this time, the entrance of the player character into a specific building, or the player's conversation with a specific person, performs transfer to an event screen, namely, a screen on which the player character fights with a rival character or a character who may be an instructor (s16).

Figure 7:
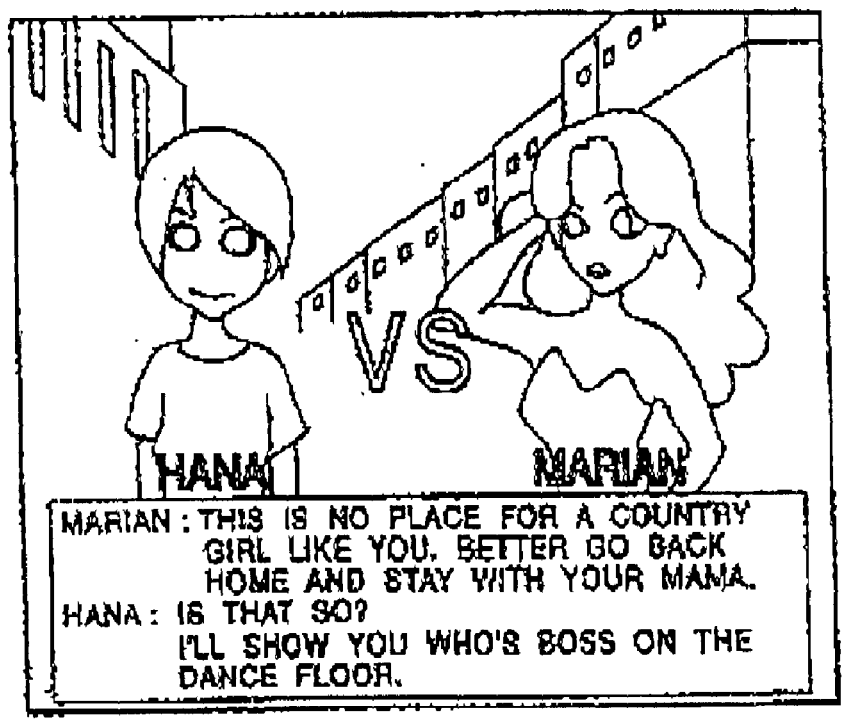
FIG. 7 is a drawing showing one example of an event screen.

FIG. 7 shows one example of an event screen, on which a close-up view of the player character and the opponent character is displayed, and it is transferred to the Dancing Part automatically or by the contents of conversation (s17). In the Dancing Part, winning by the leading character displays a winning screen (s18), and defeat of the leading character displays a defeat screen (s19), which details are described below. In the case of the defeat, the leading character can have a match again (s20).

If the building is a shop, transfer to a shop screen can be performed (s21), and if the building is a save point, transfer to a save screen can be performed (s22).

By operating a menu-display button on the field screen, a menu of two commands: the "Item Command" and the "Passport Command" can be called up (s23). By using an operation similar to that described above to select and determine either command of the menu, each screen therefor is displayed (s24 or s25)

Figure 8:
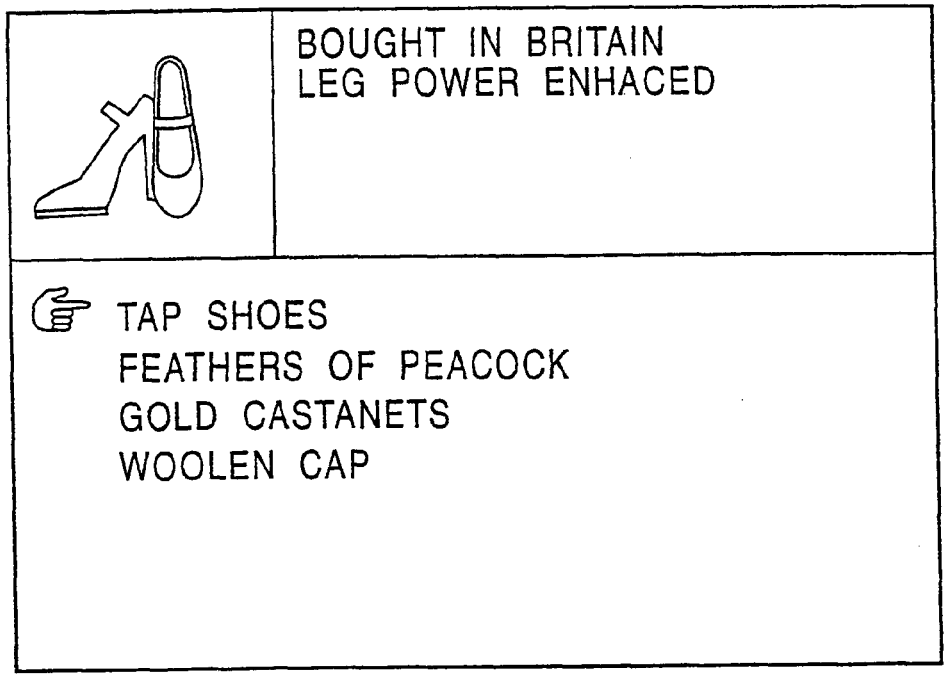
FIG. 8 is a drawing showing one example of an item screen.

FIG. 8 is one example of an item-display screen, on which items that are purchased at a shop, obtained by winning an event, and picked up on a roadside are displayed. Accordingly, selected items can be put on, taken off, thrown away, and so forth.

Figure 9:
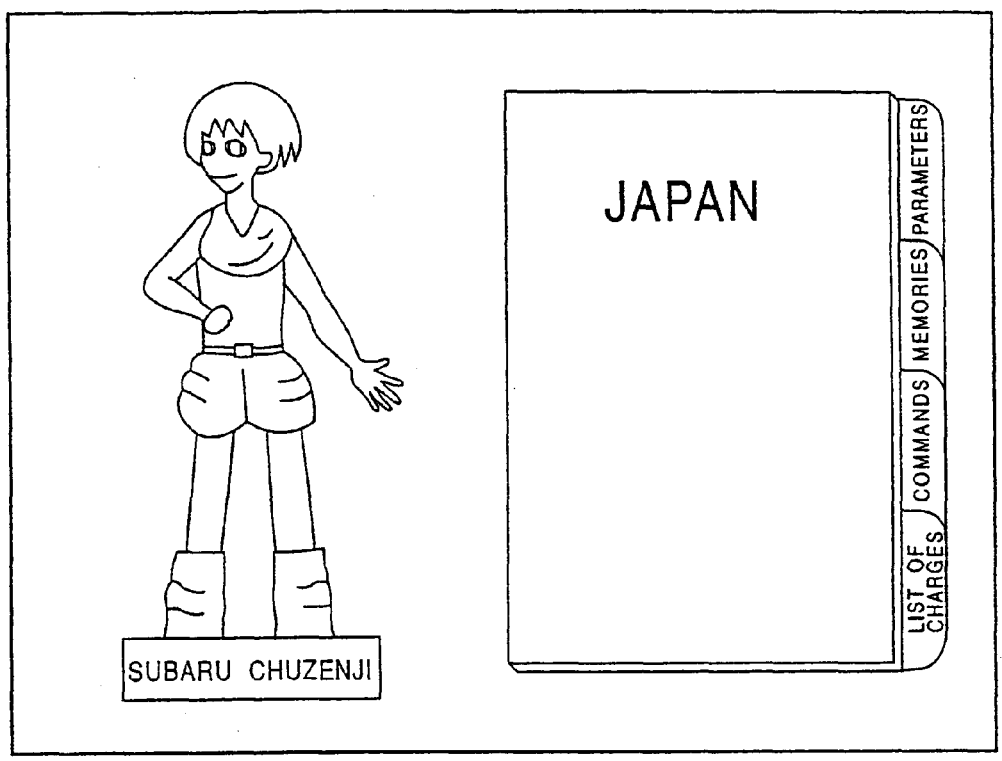
FIG. 9 is a drawing showing one example of a passport screen.
Figure 10:
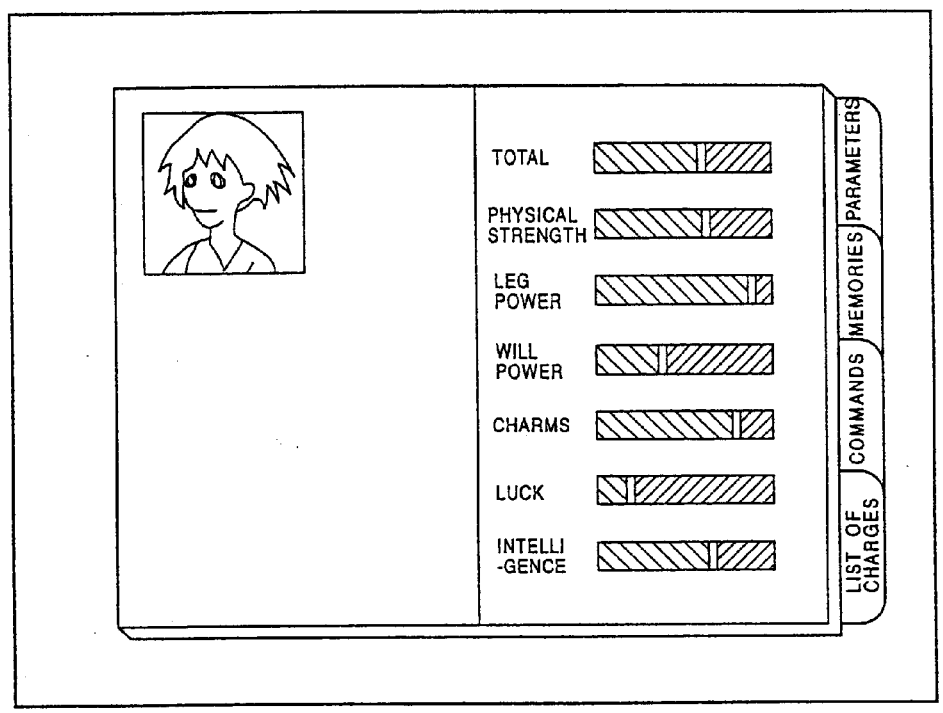
FIG. 10 is a drawing showing one example of a parameter screen.
Figure 11:
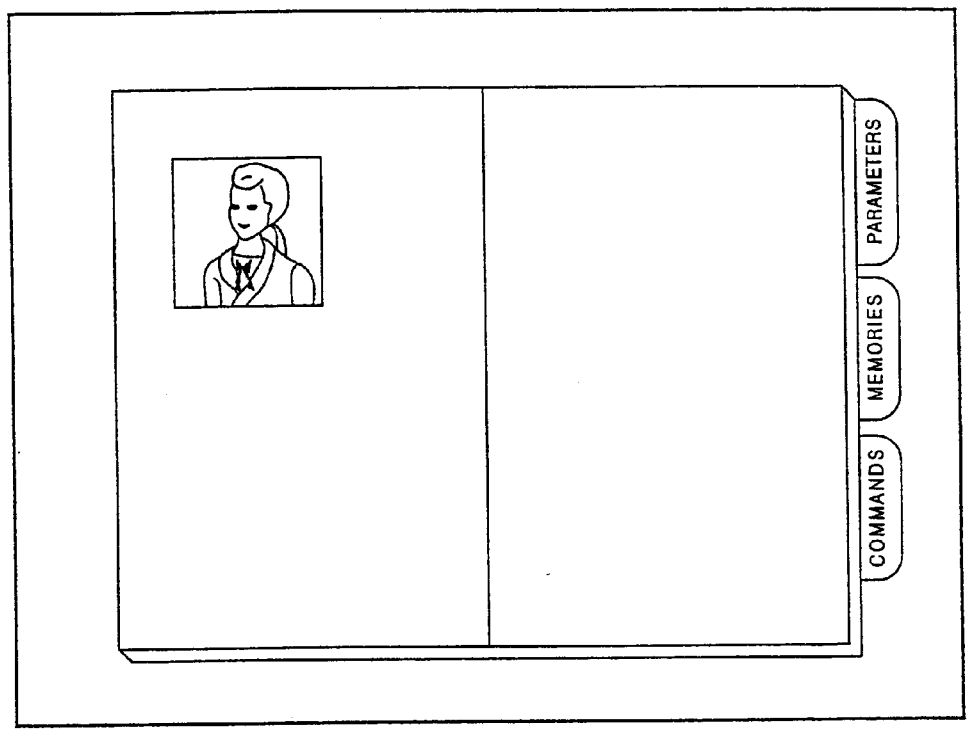
FIG. 11 is a drawing showing one example of a memory screen.
Figure 12:
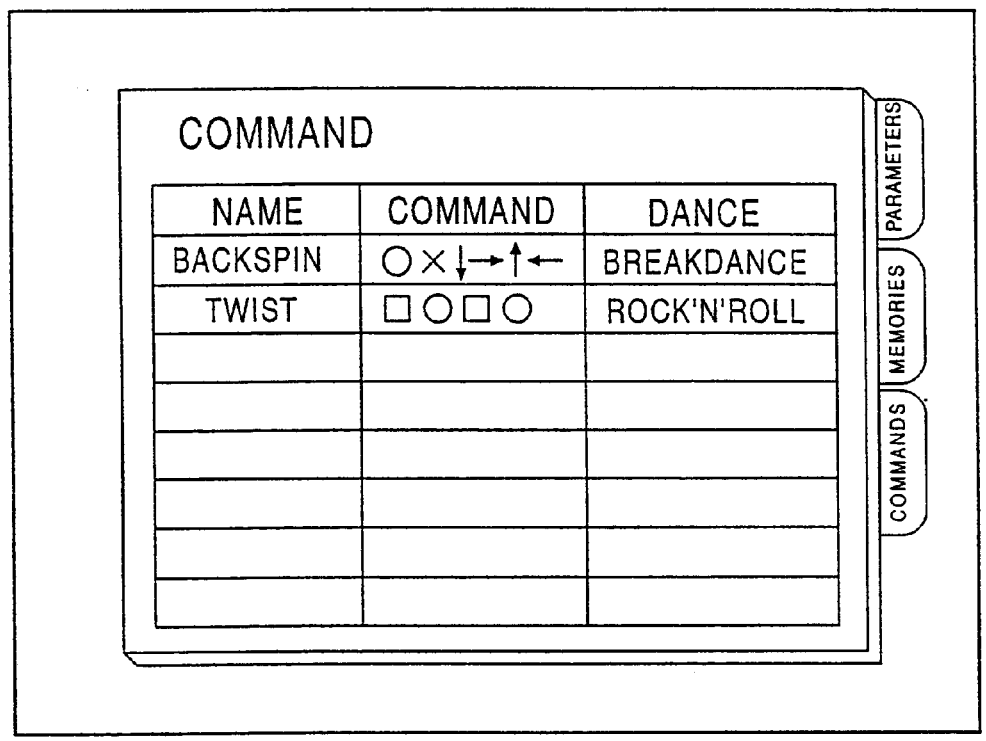
FIG. 12 is a drawing showing one example of a command list screen.
Figure 13:
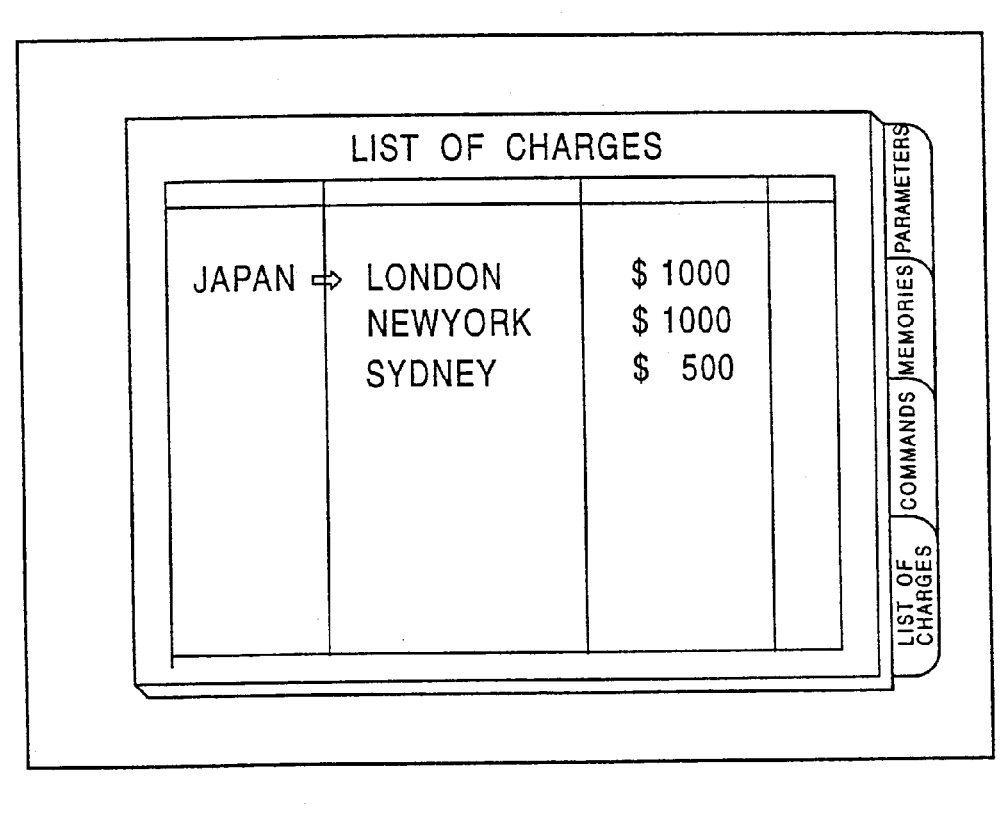

FIG. 9 is one example of the passport screen. The passport has four headings: the "Parameters", the "Memories", the "Commands", and the "List of Charges". By selecting and determining any one of them in a manner to the above-described operation, a screen showing details in each heading is displayed. Specifically, selecting the "Parameter" displays a facial photograph and a profile of the leading character, and the above-described parameters, as shown in FIG. 10. Selecting the "Memories" displays facial photographs and profiles, etc., of rival characters with which the leading character has had matches, as shown in FIG. 10. Selecting the "Commands" displays a list of dance commands capable of being used at present, as shown in FIG. 12. Selecting the "List of Charges" displays a list of charges needed for moving around countries of the world, as shown in FIG. 13.

By operating the determination button at a point in front of a bus stop on the field screen, the leading character can get on a bus and can move to an airport (transfer to an airport screen) (s26). On the airport screen, a menu of three commands: the "Travel Command", the "Passport Command", and the "Move Command (returning to the street)", is displayed.

Here, the use of operation similar to that described above to select and determine the Travel Command (s27) performs transfer to a world-map screen on which the present location of the leading character and cities to which the leading character can move are displayed (s28). Selecting and determining the city to which the leading character moves (s29)

performs transfer to a field screen of the destination via a move-by-air screen. Selecting and determining the Passport Command (s30) displays the above-described passport screen (s31). By selecting and determining the move command (s32), return to the field screen of the present location is performed. By performing cancellation after the transferring to the world-map screen (s33), return to the field screen of the present location can be performed.

Next, the Dancing Part is described.

The Dancing Part causes the player (leading) character, who is displayed using three-dimensional (3-D) graphics, to dance in time with music, and determines the issue by evaluating this dance and the dance of the opponent character, who is operated by the computer (CPU), based on predetermined standards. The dance is a combination of types of short dances (actions), and one action is executed when a predetermined dance command is input. Dance-command inputting can be performed by operating the same keys or different keys twice or more times in predetermined order; simultaneously operating keys of at least two types; operating the same key for a given interval or more, or arbitrarily combining these operations.

Figure 14:
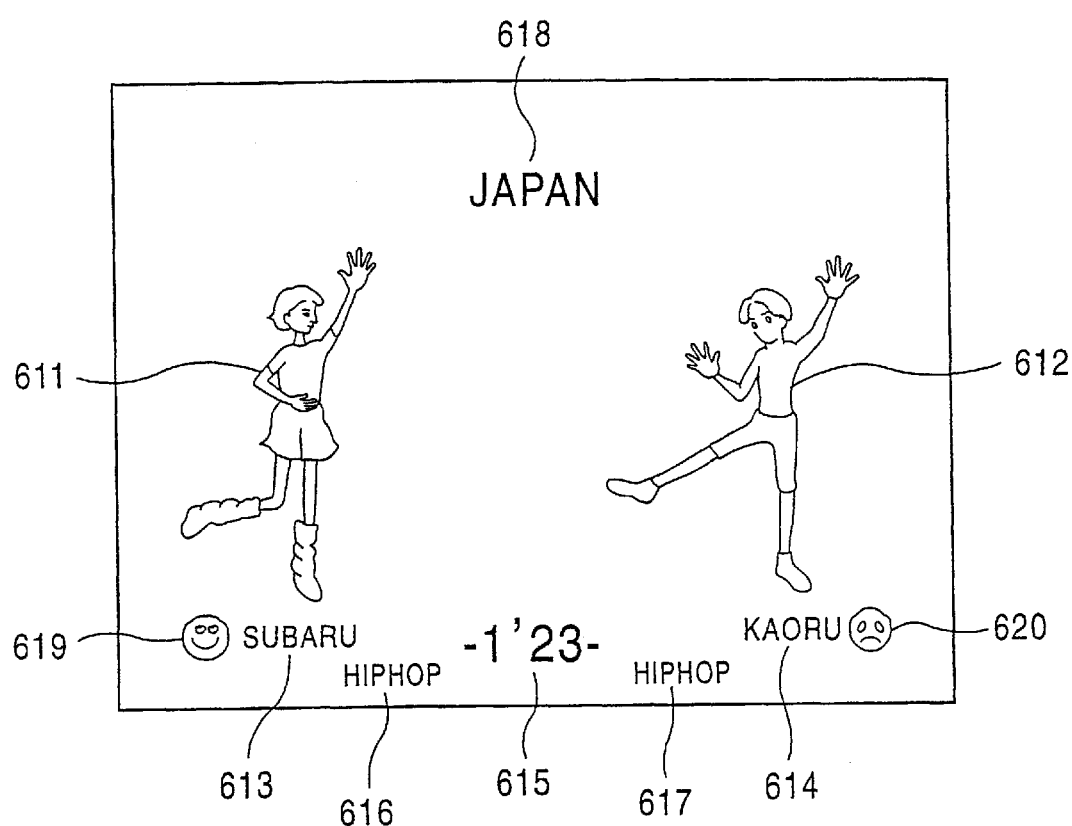
FIG. 14 is a drawing showing one example of a screen in the Dancing Part.

FIG. 14 shows one example of a screen in the Dancing Part, which displays: leading and opponent characters 611 and 612, the names of the characters 613 and 614, remaining time until music ends 615, the types of dances 616 and 617 to which the characters are dancing, a stage name (country name) 618, and condition meters 619 and 620 (expressed by faces beside the names here) indicating the character conditions. In the case where the opponent is a character to become an instructor, a next-command display window composed of a dance command to be input next and the dance name is displayed on a lower portion of the screen.

Figure 16:
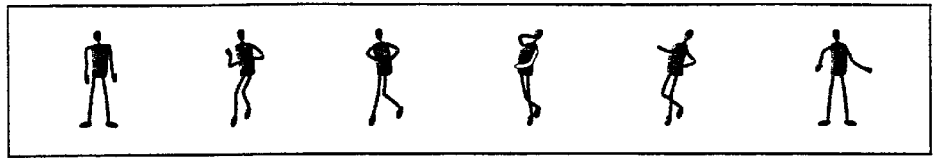
FIG. 16 consists of drawings showing specific actions.
Figure 16:
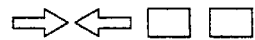
Figure 16:
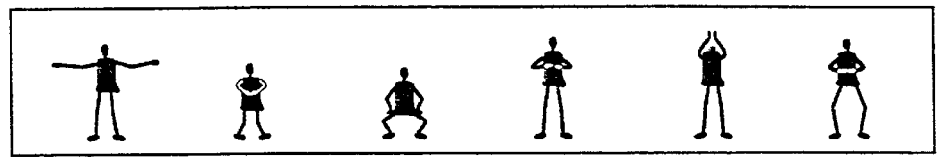
Figure 16:
Figure 16:
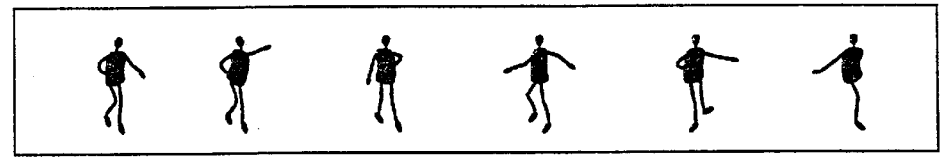
Figure 16:
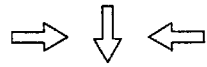
Figure 16:
Figure 16:

FIG. 15 shows specific dance commands and the action names thereof. In the commands, "→", "←", "↑", "↓", "○", "x", "Δ", and "□", mean the operating of the keys 201, 202, 203, 204, 205, 206, 207, and 208, respectively. In FIG. 16, (a), (b), (c), and (d), by way of example, four specific actions are shown.

In this game, when commands are continuously input, in other words, the next command is input before the action by the previously input dance command ends, the character will proceed to the next action. In this processing, in the case where an input interval is extremely short, or there is something wrong with the connection between the present action and the next action (e.g., the character does a handstand in the middle of jumping, etc.), the next action is not executed, which is regarded as a failure, and the present action ends. Conversely, in the case where the connection between the present connection and the next connection is good (e.g., the character rotates the body while jumping), a composite action may be performed. The character is basically not moved by command inputting, but its position may be moved as a result of an action.

Figure 17:
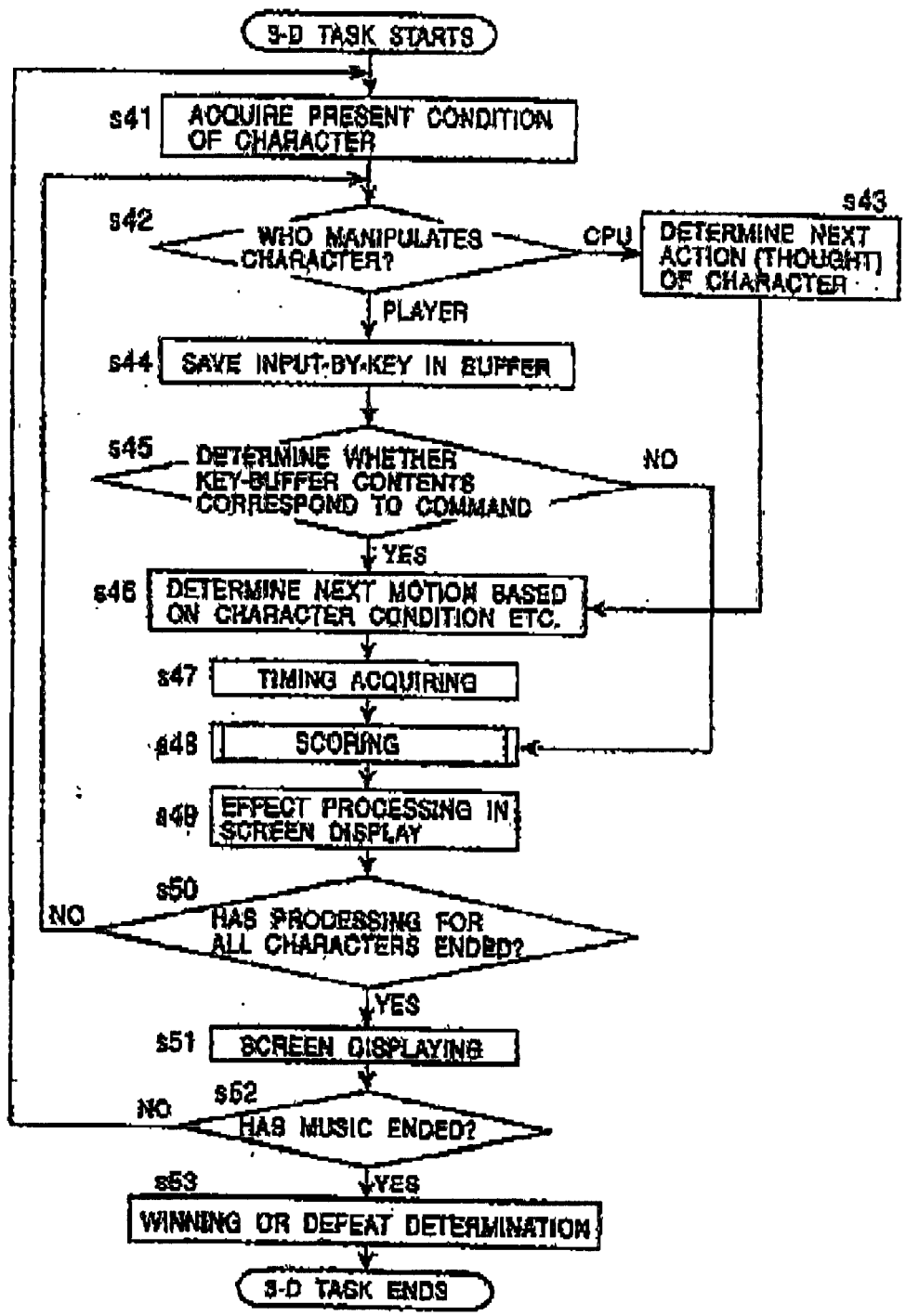
FIG. 17 is a flowchart showing the program of the Dancing Part.

FIG. 17 shows the flow of the program in the Dancing Part. The flow is described below.

At first, the present condition of the character is acquired (s41). The present condition of the character represents the condition meter (character condition) at the point of time, and an action being performed by the character. It influences the feasibility of the next action.

In the condition meter, a highest condition and a lowest condition are expressed as relative values 100 and 1, respectively. There is a dance command that can be used only when the value is the highest. The possibility that an action fails is influenced by the difference between the condition meters of the player character and the opponent character. The condition meter is incremented when a big action (action difficult to be input) is determined, or no input errors are detected for a predetermined period, while it is decremented when an action fails, no action is performed for a predetermined period, or the opponent character determines a big action.

Next, it is determined which manipulates the character, the player or the CPU (s42). If the CPU manipulates the character, it determines the next action (thought) of the character in accordance with predetermined rules (s43). If the player manipulates the character, key operation using the controller 2 is saved (s44), and it is determined whether contents in the key buffer matches a dance command (s45).

Figure 18:
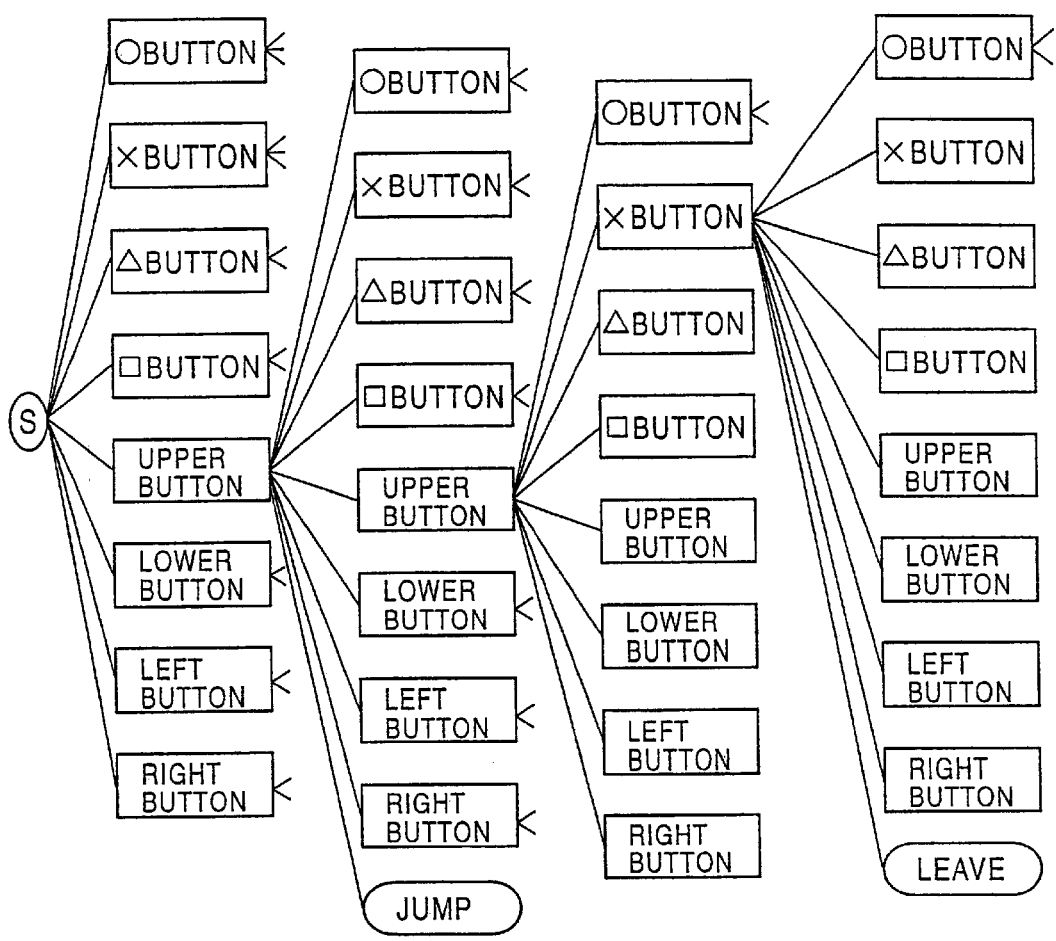
FIG. 18 is a configuration chart showing data used for determining the matching of dance commands.

FIG. 18 shows the structure of data used for matching determination, which is a hierarchical tree structure having a number of trees corresponding to the number of keys used for inputting dance commands, namely, "8". The tree structure is traced in the order of key inputs saved in the key buffer, whereby it is determined whether or not there is a dance command matching contents in the key buffer. At this time, there is no dance command, it is determined that command inputting has failed. In addition, if an action branches below data representing the final key, it is determined that the dance command for the action has been input. In the example shown in FIG. 18, the input "↑" and the input "↑·↑·x" represent dance commands for the actions termed "jump" and "leap", respectively.

In the case where command inputting does not fail in the above-described command determination, the next motion is determined based on the relationship with the above-described character condition (s46). Specifically, in the middle of inputting a dance command, a motion in accordance with the previous dance command is set. In the case where command inputting is established, if there is no particular problem in connection and interval with the present action, an action is set which corresponds to an input command. If the connection is particularly good, a composite action is set as described above. Conversely, if the interval is short, or the connection is bad, it is regarded that command inputting has failed, which sets a failure action. In the case of the failure action, reactions such as "tumbling" and "falling" are performed based on the value of the condition meter. In the case of the CPU-manipulated character, a motion is similarly determined.

The determination of the motion performs timing acquiring for extracting the present condition of music (s47). Actually extracted data is the information "How many frames are there from the present point in time to the next beat (accent in the rhythm of music)?". The "frame" means one image frame, and this game operates using 1/30 of a second for one frame.

Figure 19:
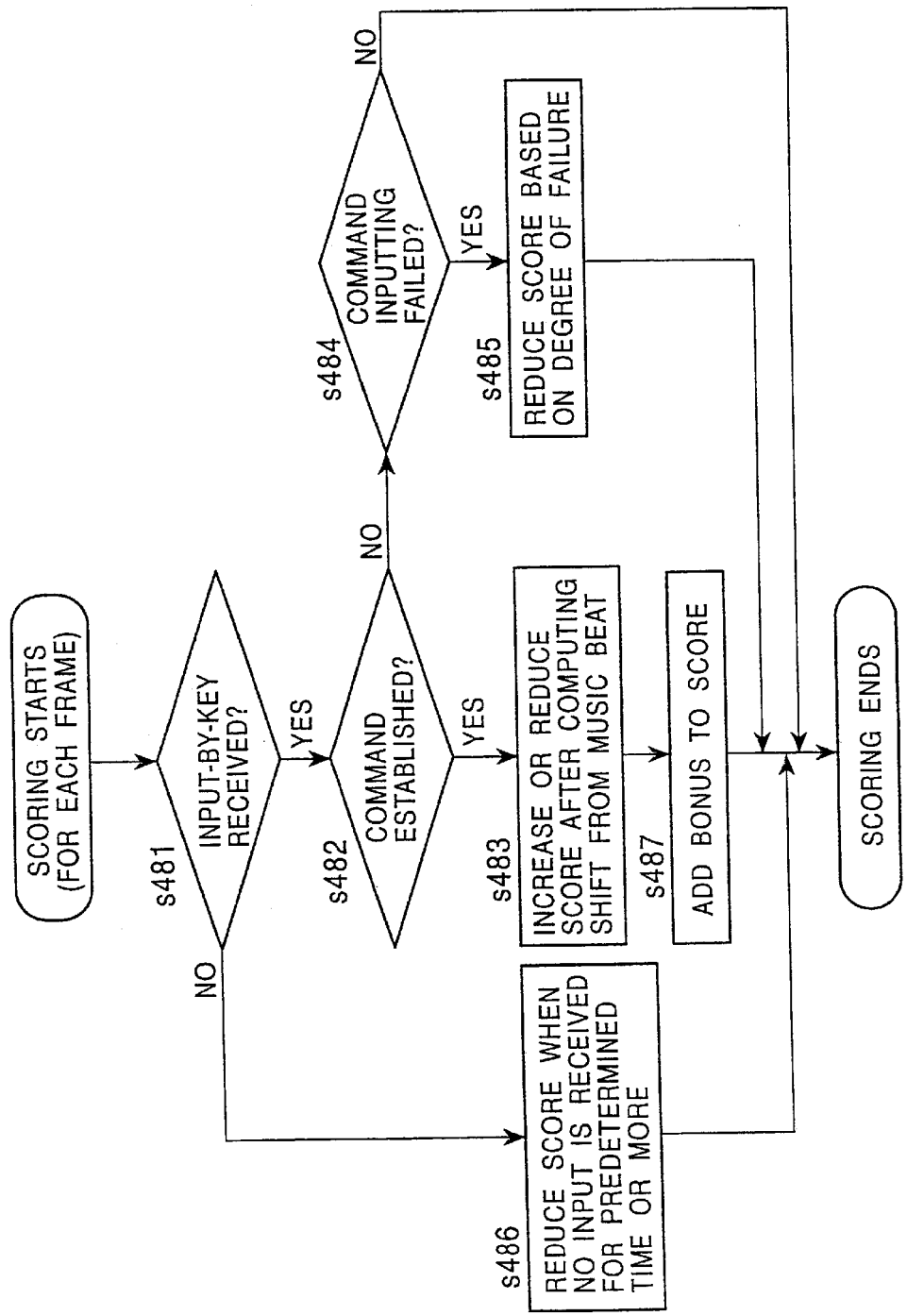
FIG. 19 is a detailed flowchart showing scoring.

Scoring is subsequently performed. The scoring increases or reduces the score so as to correspond to the motion of the character for each frame (s48). In FIG. 19, the flow of a detailed program for the scoring is shown.

Specifically, it is determined whether there is a key input (s481). If there is a key input, and the command inputting is established in the above-described command determination (s482), a shift between the timing of the command establishment (last key input in command), and timing information obtained in the above-described timing acquiring, namely, a music beat, is computed, and the score is increased or reduced based on the magnitude of the shift (In detail, the difference between a frame in which the command is established, and a frame having the next beat, is found, and the score is further increased as the difference decreases, namely, the degree of matching the music beat is higher, while the score is further reduced when the difference is larger)(s483).

In the case where there is a key input and a command is not established, it is further determined whether command inputting has failed (s484). If command inputting has failed, the score is reduced based on the degree of the failure (s485). If it is not regarded that command inputting has failed, the process ends being regarded as having been in the middle of inputting. In the case where no key input is received for a given interval or more, the score is reduced (s486).

In addition, in the case where a highly difficult command is input; successive actions are performed; a composite action is performed; no command is input for not less than predetermined time; or the connection (construction and balance) between actions is good, a bonus is added to the scored (s487).

When the scoring ends, effect processing in screen display corresponding to the above-described character motion, namely, the motion of hair and clothing, the position of a camera or light, sound effects, etc., are processed (s49).

Figure 20:
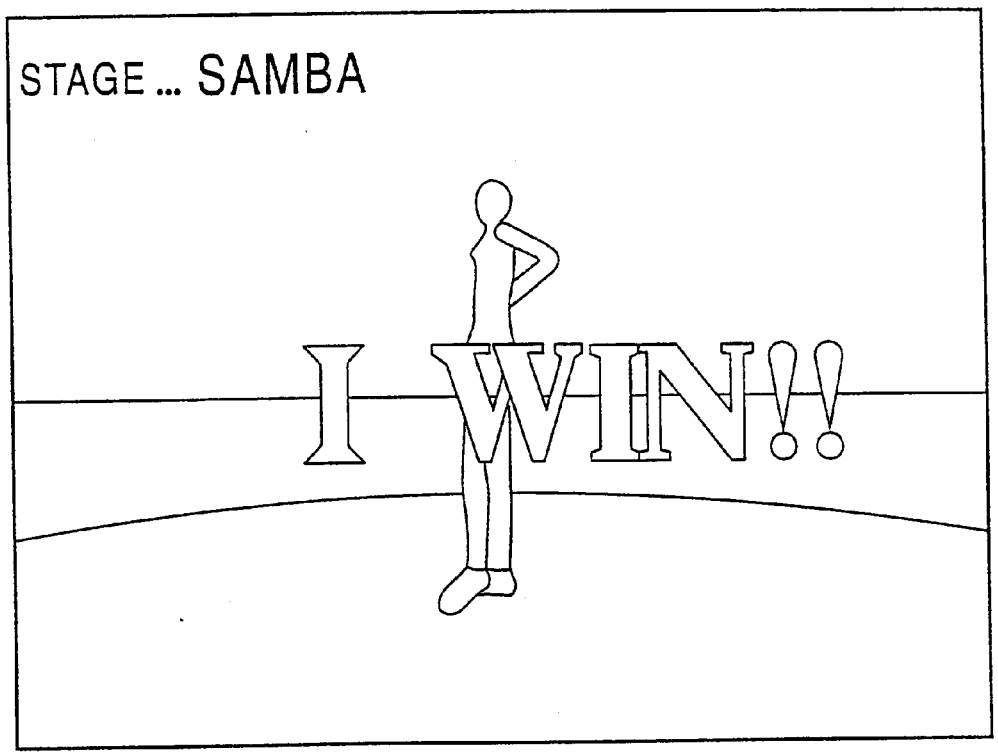
FIG. 20 is a view showing one example of a winning screen in the Dancing Part.
Figure 21:
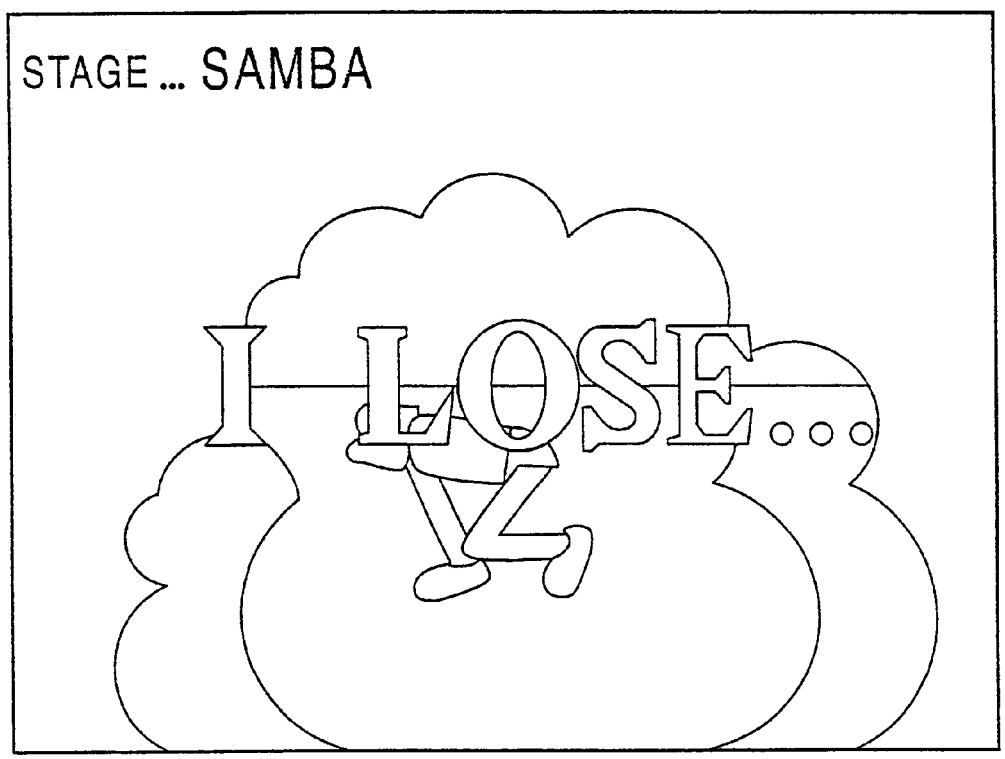
FIG. 21 is a view showing one example of a defeat screen in the Dancing Part.

When the above-described processes end for all the characters (s50), screen displaying (including sound processing) is performed (s51). Moreover, the foregoing processes are repeatedly performed until the music ends (s52), whereby, based on the score of each character counted in this game, the issue is determined, and the result is displayed on the screen (s53) before the scoring ends. One example of a winning screen is displayed in FIG. 20, and one example of a defeat screen is displayed in FIG. 21.

The Dancing Part is influenced by the above-described parameters (excluding the money). Specifically, the Physical Strength influences the incrementing or decrementing of the condition meter. As this value is greater, the condition meter is less decremented. The Instantaneous Power influences the continuous inputting of commands. As this value is greater, the continuous inputting is accepted more easily. The Willpower influences reactions performed when command inputting fails. As this value is greater, the possibility of tumbling is lower. The Luck influences the incrementing or decrementing of the condition meter. As this value increases, the condition meter is further incremented. In addition, in the Dancing Part, by operating the keys 211 and 213 of the controller 2, the position of a viewpoint (camera) can be arbitrarily changed.

Figure 22:
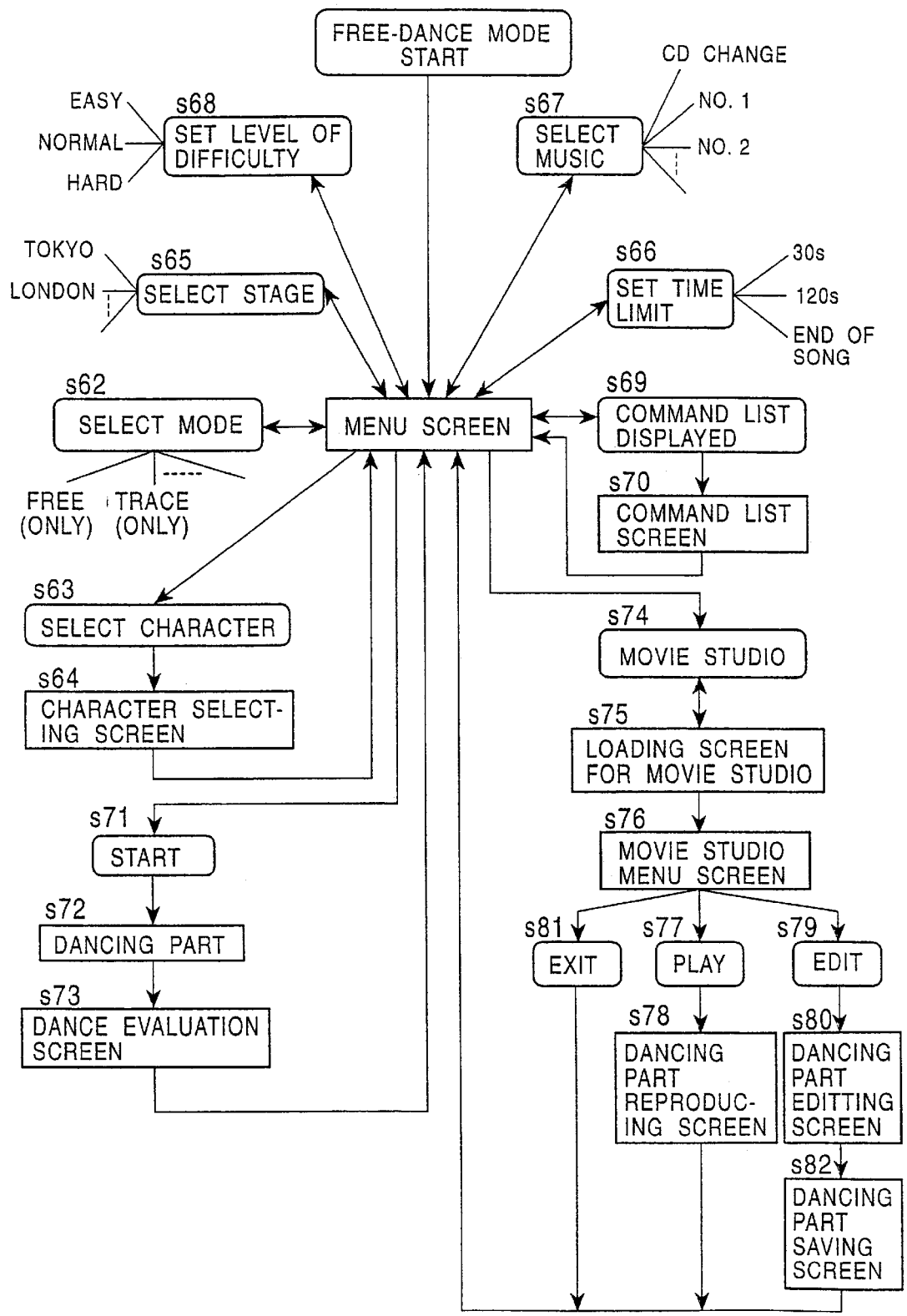
FIG. 22 is a flowchart of screen transitions showing the flow of the Free-Dance Mode in a game system according to the present invention.

FIG. 22 shows the flow of the Free-Dance Mode of the game system according to the present invention using screen transitions.

Selecting the Free-Dance Mode displays a menu screen as shown in FIG. 23 (s61). On the menu screen, the selection items: "MODE SELECT", "CHARACTER (CHARA)", "STAGE", "TIME", "SOUND", "LEVEL", "COMMAND", "MOVIE STUDIO", and "START", are vertically arranged in the center. Among them, a selected item ("START" by default) flashes.

By operating the upper and lower direction keys 203 and 204, the selected item can be changed. With an item selected, by operating the left and right direction keys 201 and 202, the contents can be changed. Also, by operating the determination button 205, with some item selected, the next screen is displayed.

When "MODE SELECT" on the menu screen (s62) is selected, ways of playing in the Free-Dance Mode can be selected. Specifically, as described above, among the following six: "1 PLAY MODE", "VS COMMODE", and "2 PLAYMODE" of the "Trace Mode", and "1 PLAYMODE", "VS COMMODE", and "2 PLAY MODE" in the "Trace Mode", one item is selected.

Figure 24:
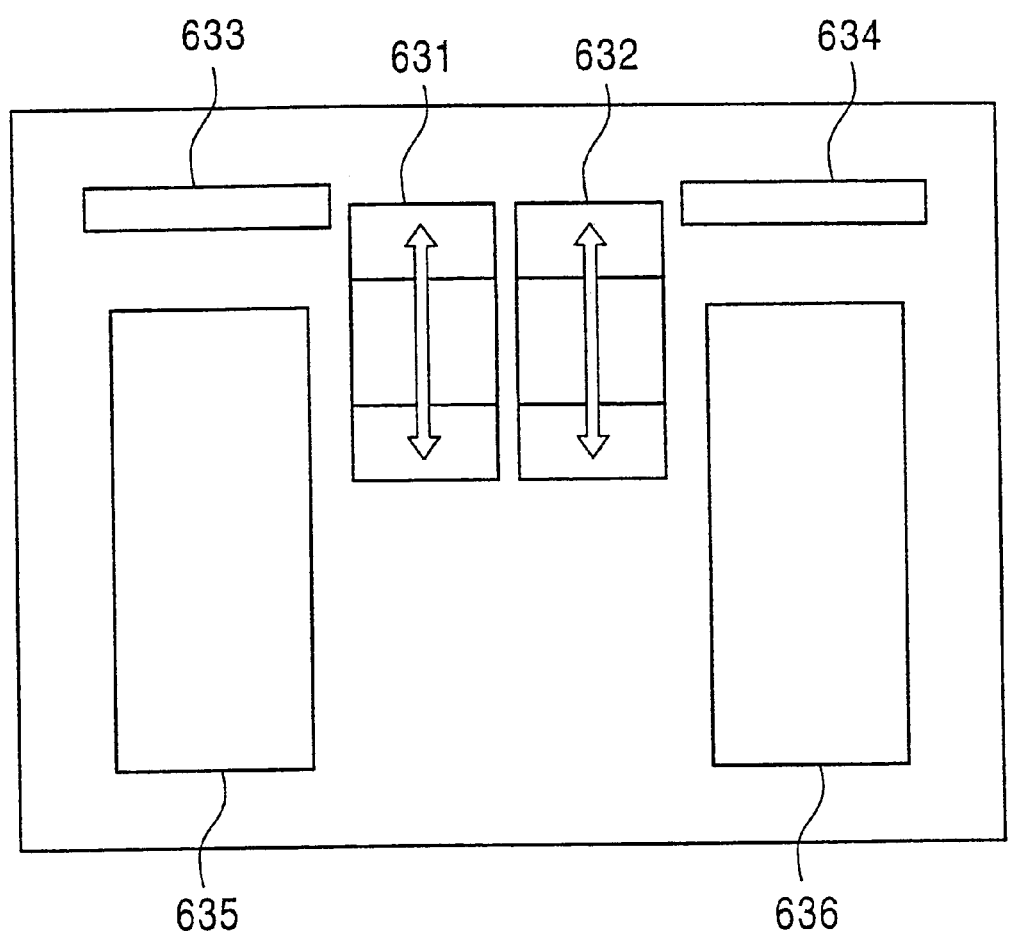
FIG. 24 is a drawing showing one example of a character selecting screen.

Selecting "CHARA" (s63) performs transfer to a character selecting screen as shown in FIG. 24 (s64), in which player and opponent characters can be selected. Specifically, selection windows for one player and two players are displayed on the right and left sides of the screen, and the faces of characters that can be selected are vertically arranged in windows 631 and 632 positioned to the center of the screen. Faces are selected using the upper and lower direction keys 203 and 204 as described above, and are determined using the key 205 (can be canceled using the key 206). At this time, the name of the selected character and the selected type of dance are displayed in upper wide windows 633 and 634, and 2-D graphics images are displayed in tall windows 635 and 636. With the character selected, by moving a cursor to the windows 635 and 635, and operating the left and right direction keys 201 and 202, the costume of the character can also be changed. Moreover, in the case where the character was defeated in the Story Mode, the character can be changed to the leading character (The selected dance can be done by the leading character). The above-described selecting is performed as follows:

In the "1 PLAY MODE", a player can select with a one-player controller a character to be manipulated by the player and a character to be manipulated by the CPU, whereas in the "2 PLAY MODE", players can select with their controllers, characters to be operated by the players.

When "STAGE" is selected (s65), which stage (country) where fighting should be performed can be selected. Specifically, nine stages used in the Story Mode (plus hiding stages) or "RANDOM" can be selected. Selecting "TIME" (s66) sets a time limit for dance. Specifically, one can be selected from three limits: 30 seconds, 120 seconds, and "END OF SONG".

When "SOUND" is selected (s67), music to be used as background music can be selected using its number. In addition to the music number, there is an item entitled "CD CHANGE". By selecting this item, in the case (described below) where music recorded on a commercial music CD is used as dance music, timing for switching from the CD-ROM 5 is displayed on the screen so that the player will be aware of it. When "LEVEL" is selected (s68), the level of difficulty in game can be set. The level of difficulty influences the strength of the CPU-manipulated character, and can be selected from the following three: "EASY", "NORMAL", and "HARD".

Selecting "COMMAND" (s69) displays a list of commands for the dance of the selected character as shown in FIG. 25 (s70) (in the case of "2 PLAY MODE" here). Concerning the hiding commands, only those detected in the Story Mode are displayed. In the case that one screen is insufficient for displaying, scroll display is performed by operating the upper and lower direction keys 203 and 204.

Selecting "START" (s71) performs transfer to a Dancing Part (s72). This Dancing Part is the same as that in the Story Mode described above (Default parameters for each character are used). After the dance ends, return to the menu screen is performed via a dance evaluation screen (s73) (Also a winning or defeat screen is included in "2 PLAYMODE" and "VS COMMODE").

In the Dancing Part in the Free-Dance Mode, dancing can be performed in time with arbitrary music of the player's preference, which is recorded on a commercial music CD, etc.

In the menu screen in FIG. 23, by selecting "SOUND", and also selecting "CD CHANGE", a message for instructing the player to change CD is displayed on the screen. Exchanging the CD-ROM 5 and the music CD displays a music number in the music CD. When the music to be played is determined by operating the left and right direction keys 201 and 202, and the determination button 205, return to the menu screen in FIG. 23 is performed. Selecting "START" in this condition performs transfer to the Dancing Part, similarly to the case where the internally stored music is used. (When the music CD is identified as a predetermined, particular music CD by performing ID checking on the music CD, a special hidden character may be set to be usable)

At this time, internally, the data of the music CD are analyzed during an introduction of the start of music to the start of dancing, whereby rhythm extracting is prepared. After the dance starts, whether the rhythm extracted from the music CD matches the timing of command inputting by the player is evaluated so that it is reflected in the score.

Figure 26:
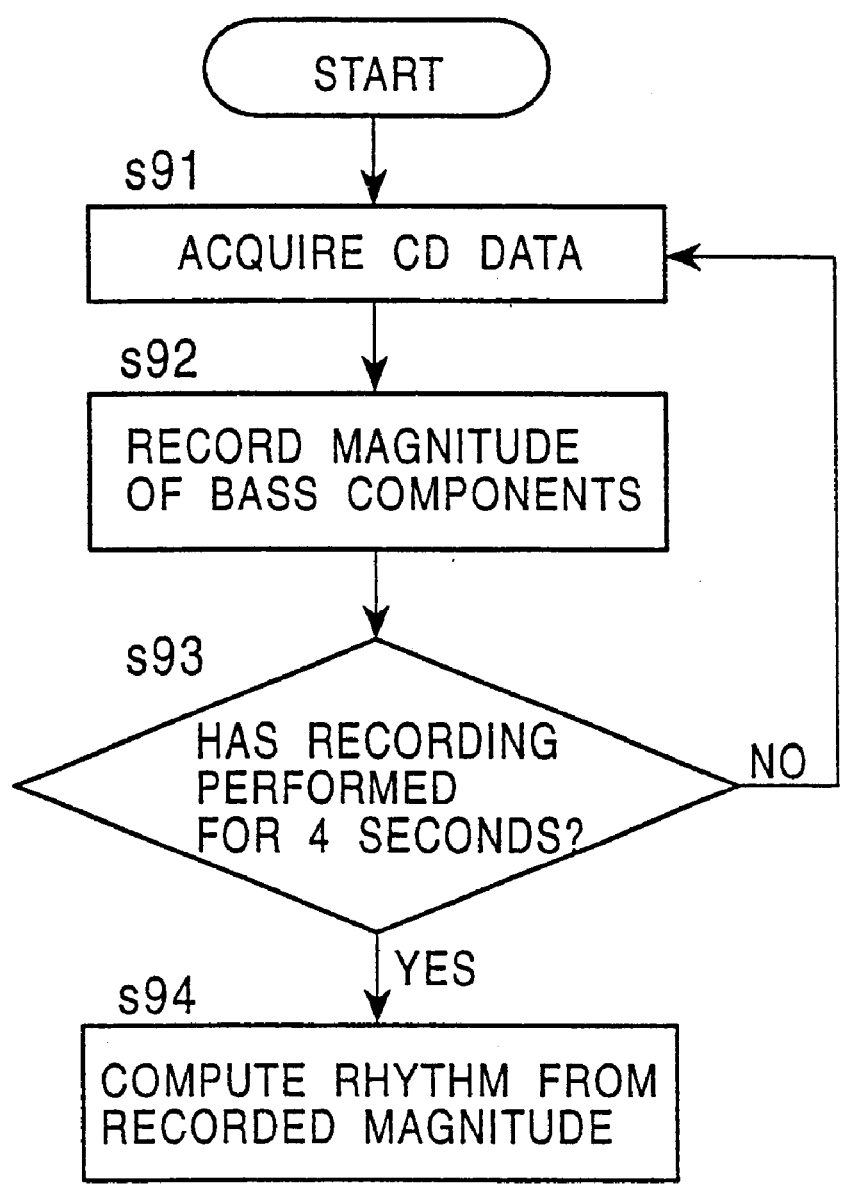
FIG. 26 is a flowchart showing the flow of a program for analyzing rhythm from a music CD.
Figure 27:
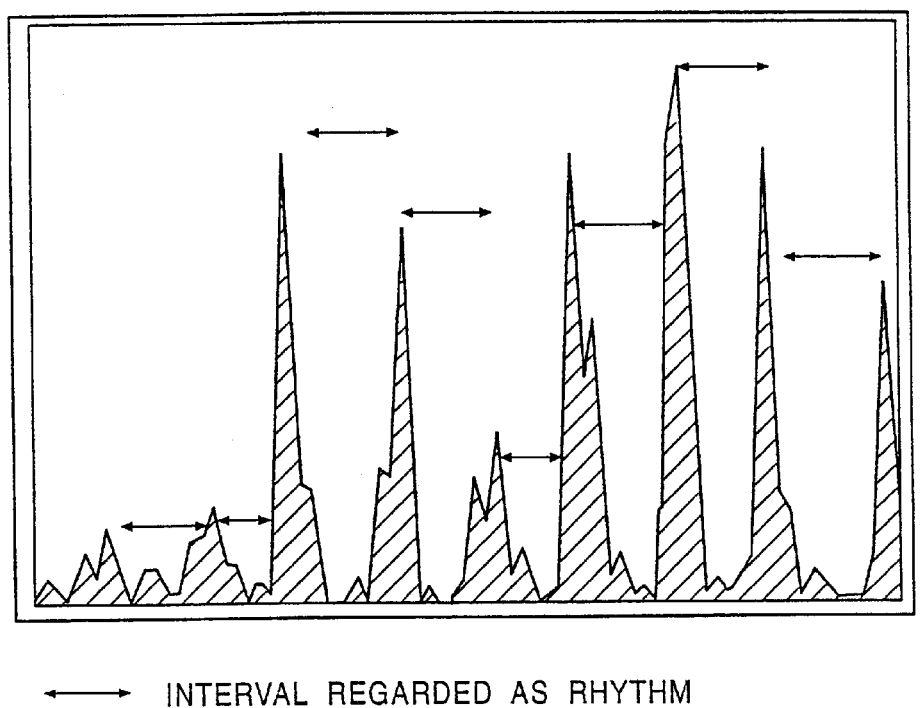
FIG. 27 is a drawing showing one example of a change in the level of sound of music in a music CD.

In FIG. 26, the flow of a program for analyzing the rhythm from the music CD is shown. By performing computation in which the data (PCM 44.1 kHz/16 bits/stereo) obtained from the music CD (s91) is multiplied by 256 bytes to form 1 sample, the magnitude of bass components is extracted and recorded (s92). This computation is performed every 1/60 of a second (1 Vsync) in order to output the Vsync interval at which the music beat is generated, and pre-sampling at 256/60 (4.3 seconds is V performed for computing the rhythm from statistics of 256 samples (s93 and s94). In FIG. 27, one example of level change of music in the music CD is shown.

Selecting "MOVIE STUDIO" (s74) performs transfer to a movie studio. In the movie studio, the dance in the Dancing Part played just before the movie studio, or a dance that was saved in the movie studio and that was loaded when transfer to the movie studio, can be replayed. It can be edited to create an original video clip. What can be edited are the following three: camera perspective position, light adjustment (position and intensity); and effects (spotlight, etc.).

In the case where transfer to the movie studio has been performed, a loading screen for the movie studio is displayed (s75). The loading screen has the alternative of loading or not loading, and a plurality of saved data. By using an operation similar to that described above to select and determine whether to perform loading, or to select and determine saved data to be loaded, transfer to the menu screen for the movie studio is performed (s76).

The menu screen for the movie studio has "PLAY", "EDIT", and "EXIT" as options. By operating the upper and lower direction keys 203 and 204, and the determination button 205 before selecting the "PLAY" (s77), transfer to the proximate screen or the loaded replay screen in the Dancing Part is performed (s78). Also, selecting "EDIT" (s79) performs transfer to an editing screen in the Dancing Part as shown in FIG. 28 (s80), and selecting "EXIT" (s81) performs return to the menu screen in FIG. 23.

Figure 28:
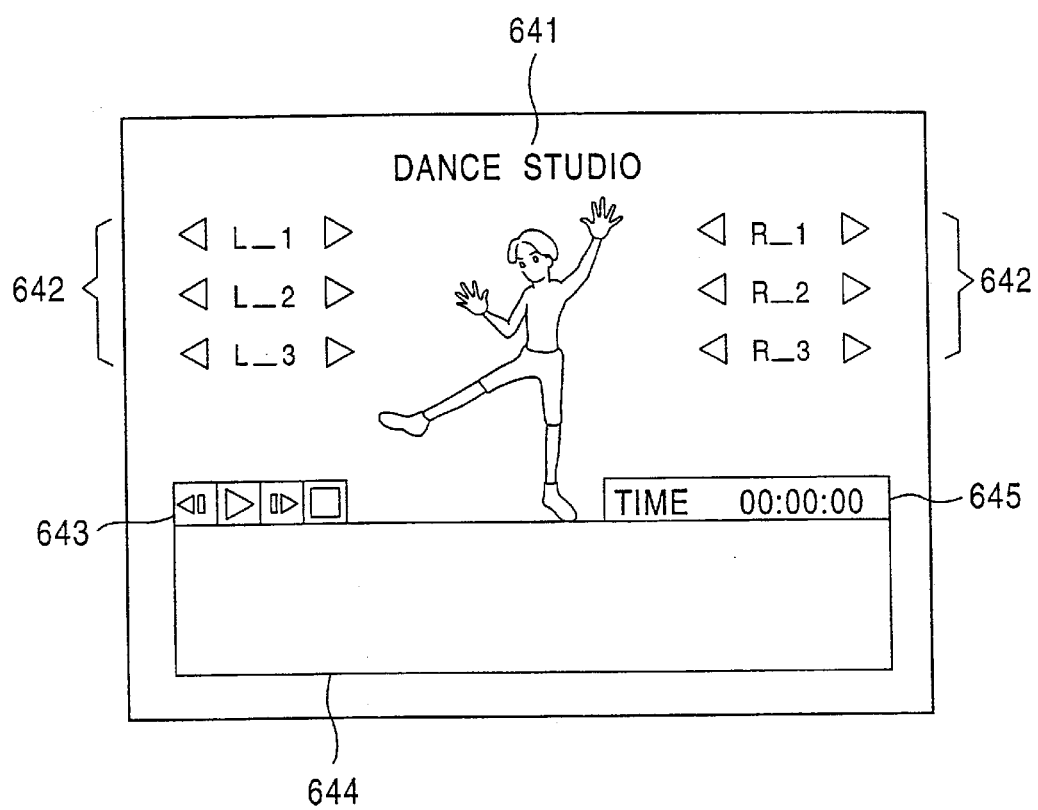
FIG. 28 is a drawing showing one example of an editing screen in the Movie Studio.

FIG. 28 shows one example of the editing screen displaying: a dancing character 641 to be edited, key assigned Go indications 642 indicating how to use controller keys, an operation panel 643 on which buttons for reproducing and halting the dance are arranged, an information window 644 for displaying various information; and a time 645. Actual editing is performed such that, while the dance is being reproduced, the camera perspective position is changed, the light is adjusted, and the effects are applied in controller operation. The editing can be performed for each frame, and can be repeatedly retried. In the case where data are not loaded and the previous Dancing Part was performed in "2 PLAY MODE", a message for asking which dance should be edited, for one player or two players, is displayed before editing.

When the dance ends and editing is finished, transfer to the save screen for the movie studio is performed (s82). The save screen has: the alternative of saving or not saving, and a plurality of saved data files the same as on the loading screen. By selecting and determining "not saving", or selecting and determining a save data file to be saved, return to the menu screen in FIG. 23 is performed. When saving is performed, an action sequence, a change in the camera perspective position, a change in the light, and timing of the effects, are stored in the save data file.

Figure 29:
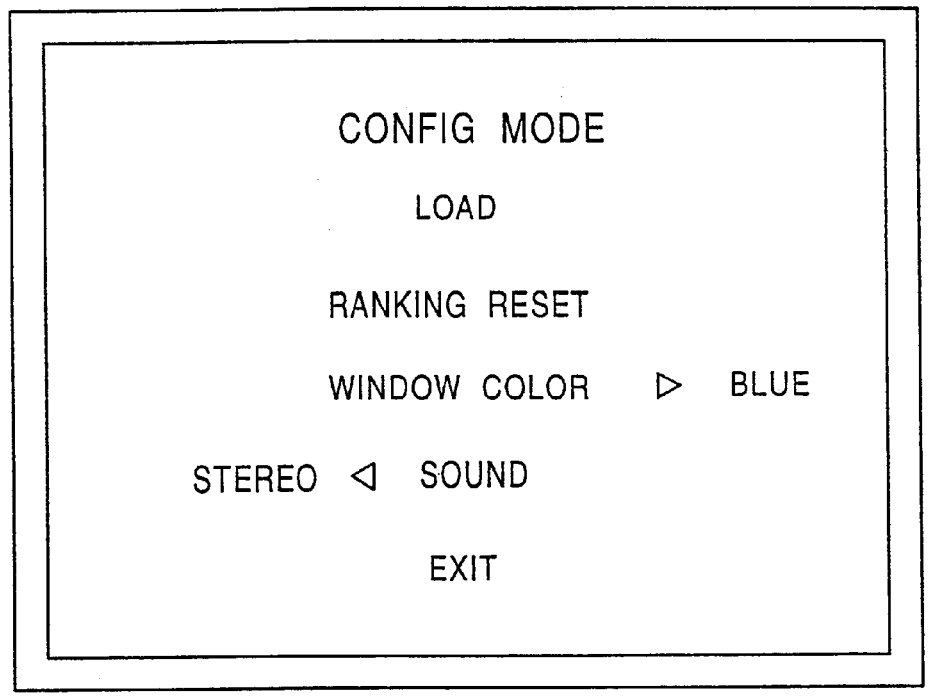
FIG. 29 is a drawing showing one example of a menu screen in the Config Mode.
Figure 30:
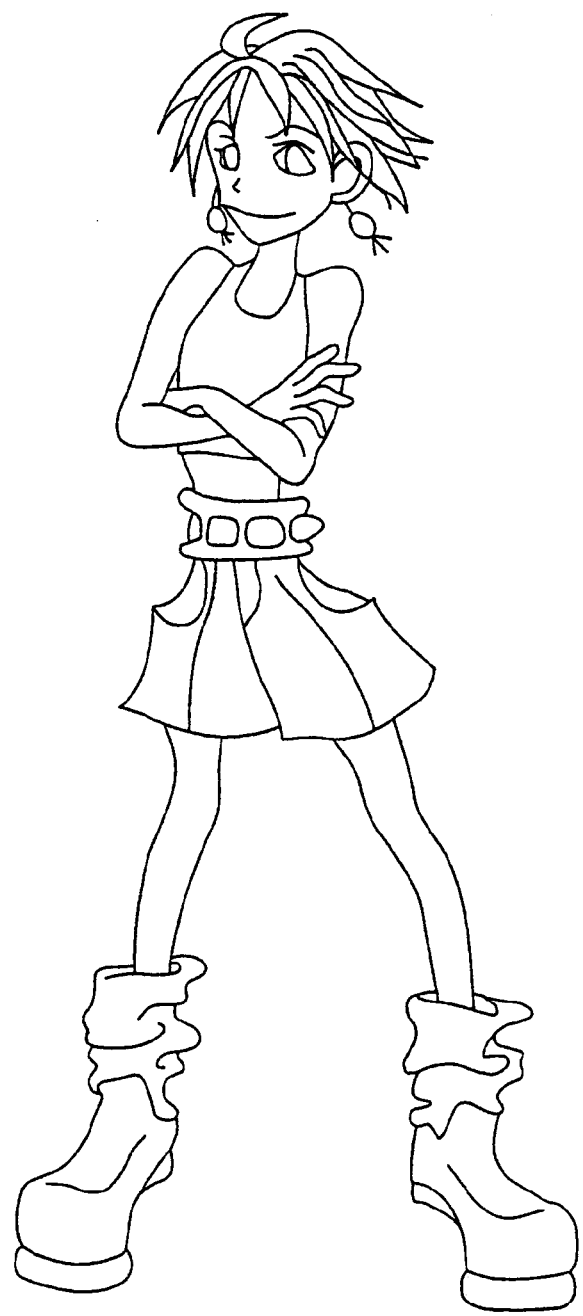
FIG. 30 is a drawing showing one example of a game character.
Figure 31:
FIG. 31 is a drawing showing one example of a game character.
Figure 32:
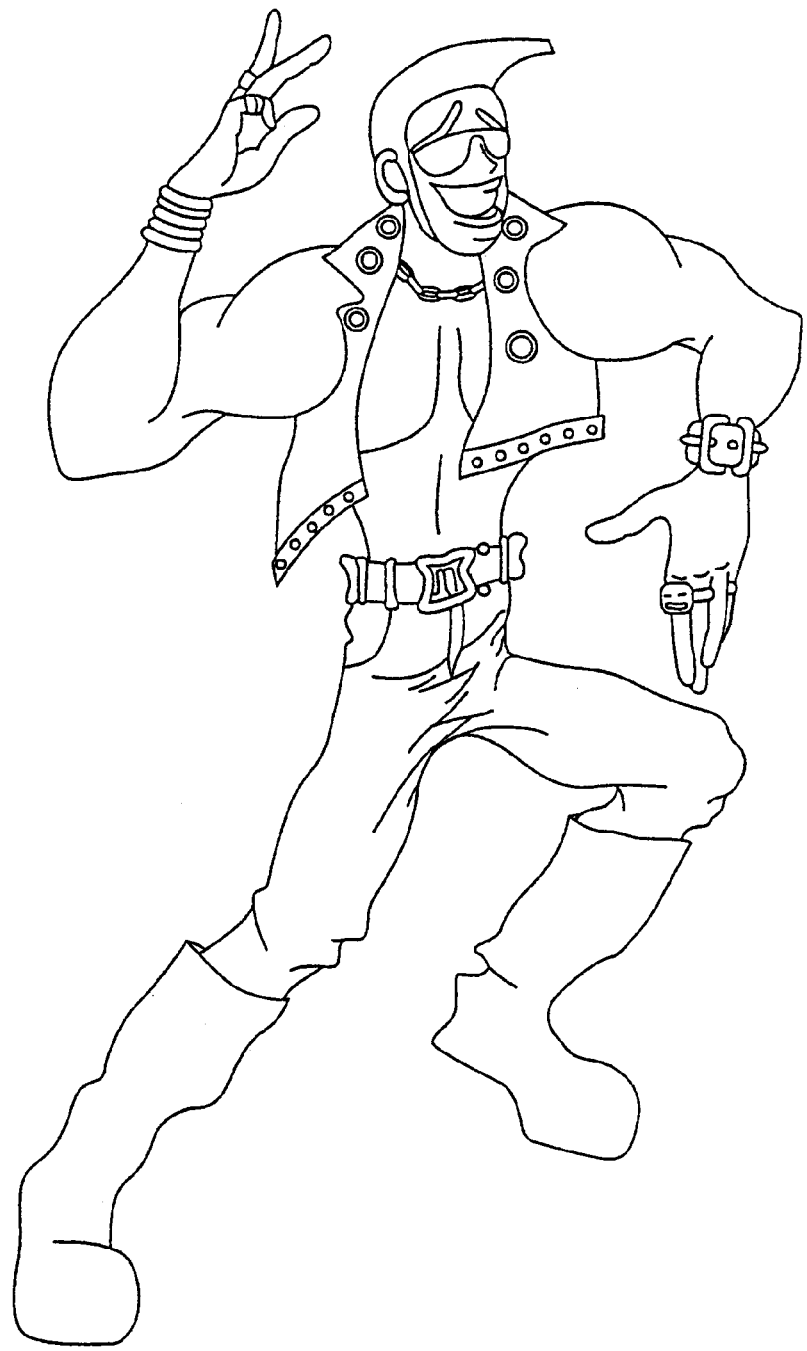
FIG. 32 is a drawing showing one example of a game character.
Figure 33:
FIG. 33 is a drawing showing one example of a game character.

In the title screen of this game system, selecting "CONFIG MODE" displays a menu screen in the mode as shown in FIG. 29. On the menu screen, selection items: "LOAD", "RANKING RESET", "WINDOW COLOR", "SOUND", and "EXIT" are vertically arranged in the center of the screen, and among them, a selected item ("EXIT" by default) blinks.

The selected item can be changed by operating the upper and lower direction keys 203 and 204. With an item of a sub-item selected, by operating the left and right direction keys 201 and 202, its contents can be changed. Concerning another item, by operating the determination button 205, a message representing execution confirmation is displayed, and by operating the determination button 205, the item is executed.

Selecting "LOAD" on the menu screen can load basic data (characters capable of being used, commands, etc.). Normally, the basic data are automatically read when the game is activated. However, they are used when they need to be read again due to exchange of memory cards. Selecting "RANKING RESET" can delete various types of ranking data displayed in the title demonstration. Selecting "WINDOW COLOR" can change the colors (e.g., any of preset eight colors) of a window, fonts, etc., to be used in the game. Selecting "SOUND" can switch a sound output to "STEREO" or "MONAURAL". Selecting "EXIT" performs return to the title screen.

In FIG. 30 to FIG. 33, examples of game characters used in the present invention are shown.

Figure 34:
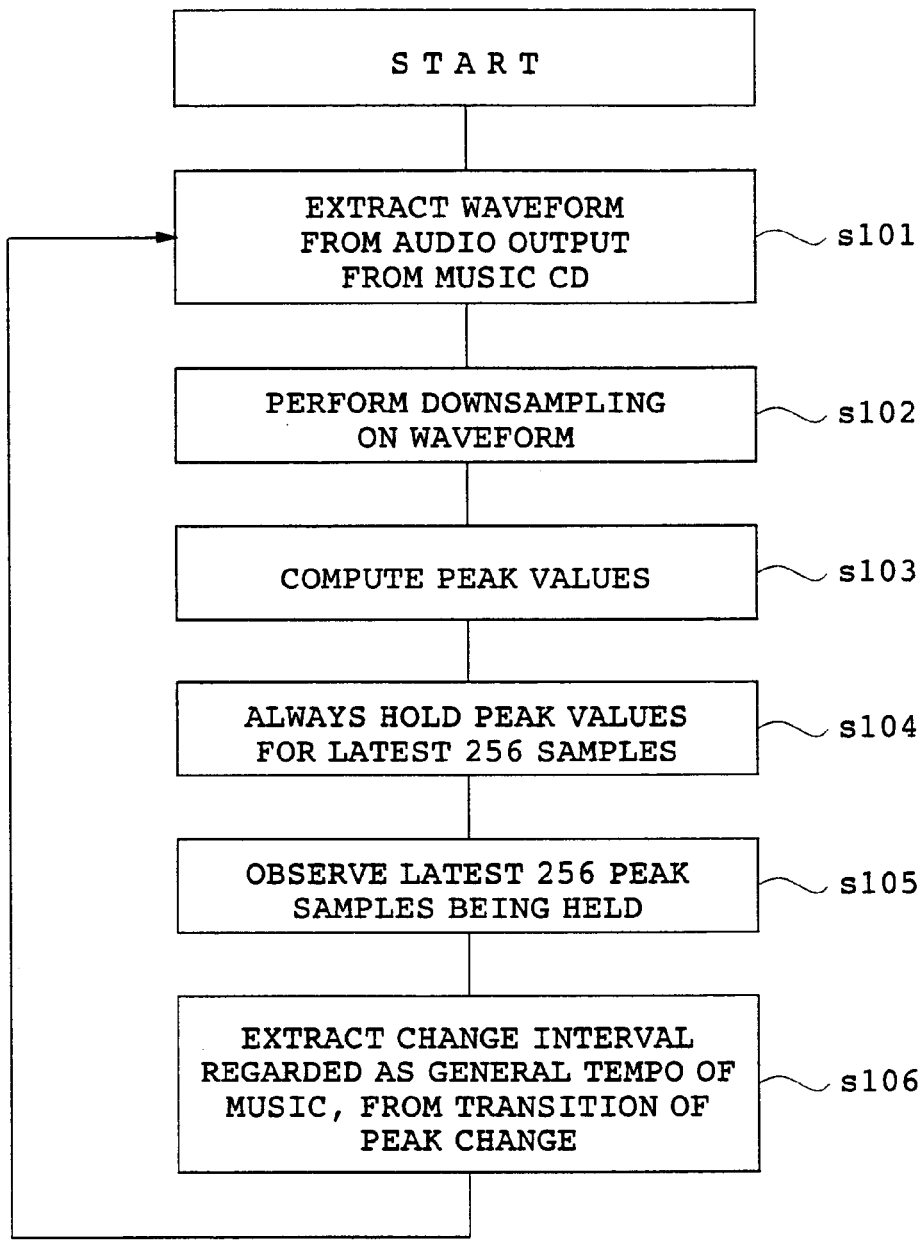
FIG. 34 is a flowchart of another program for analyzing rhythms of the music CD.

FIG. 34 shows the flow of another program for performing rhythm analysis when a music CD is used for game background music.

In this program, 256 sample of waveform data, as a sound output with the playback of the music CD, are extracted every 1/60 seconds (s101), and these are used as original data to perform computation and estimation. In other words, by performing pseudo-downsampling on the extracted waveform data (s102), the data are processed to be a waveform in which bass components are enhanced. From the processed waveform data, peak values are obtained (computed) (s103). The peak values are always stored for the latest 256 sample (s104). Changes in the peak values for the latest 256 samples are observed (s105). Estimation of a vertical change regarded as a rhythm observes whether an interval regarded as a tempo (the least rhythm) of general music periodically appears as a vertical change, whereby a tempo regarded to be closest is estimated as a tempo which a piece of music being played has (s106).

Figure 35:
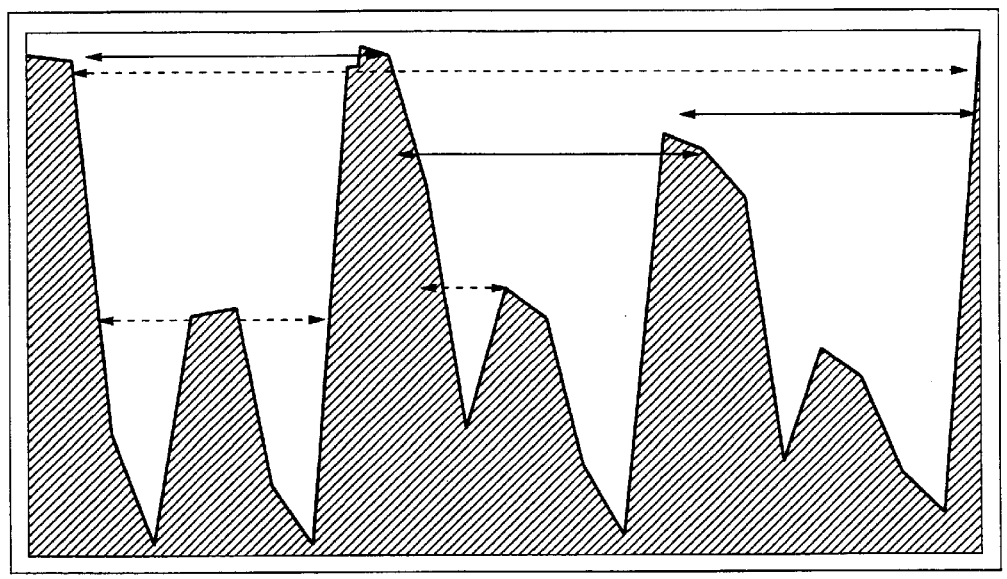
FIG. 35 is a drawing showing another example of level changes of music in the music CD.

FIG. 35 shows another example of the level change of a piece of music in the music CD, in which each solid line having arrows indicates a peak change interval predicted as a tempo of general music, and each dot line having arrows indicates a peak change interval that is not regarded as a tempo.

In the case where a multiple of the tempo (the least rhythm) in the music, for example, a four-fold (quadruple) rhythm is used as a timing for performing key operations on dance commands, it is impossible to specify which of the extracted tempos as the starting point (the start of a measure of the music) of the quadruple rhythm. Thus, without performing processing, the timing acquisition described using FIG. 17 can be only performed.

Figure 36:
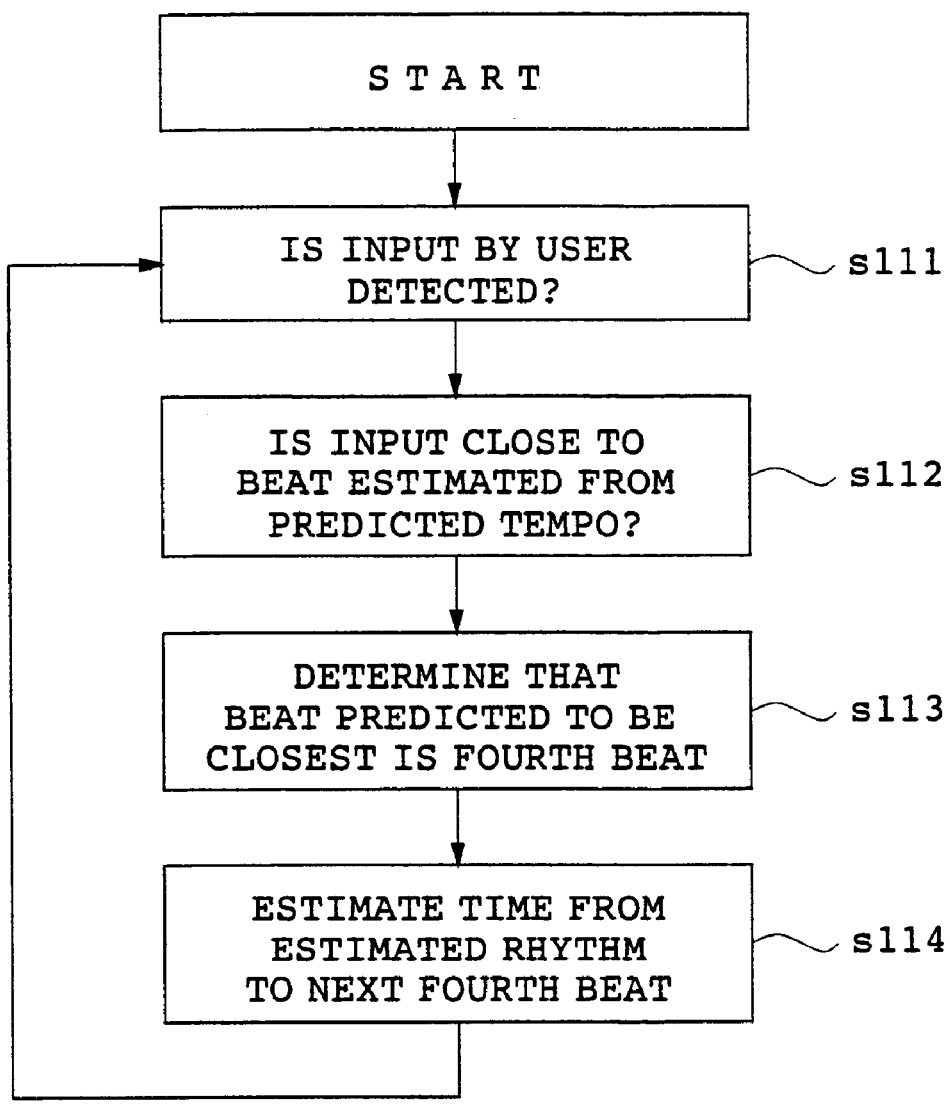
FIG. 36 is a flowchart of a program for specifying, based on an input from the player, the start of a measure of music.

Accordingly, the flow of a program for specifying the start of the measure of the music based on an input by the player is shown in FIG. 36. Specifically, when an input (key operation) by the player is detected (s111), the input timing is compared with the timing of the extracted tempo, whereby the timing of the closest tempo is determined to be quadruple (the starting point of the rhythm) (s112, s113), and the timing is used as a starting point to estimate a time up to the next quadruple time (s114). This performs the timing acquisition.

Figure 37:
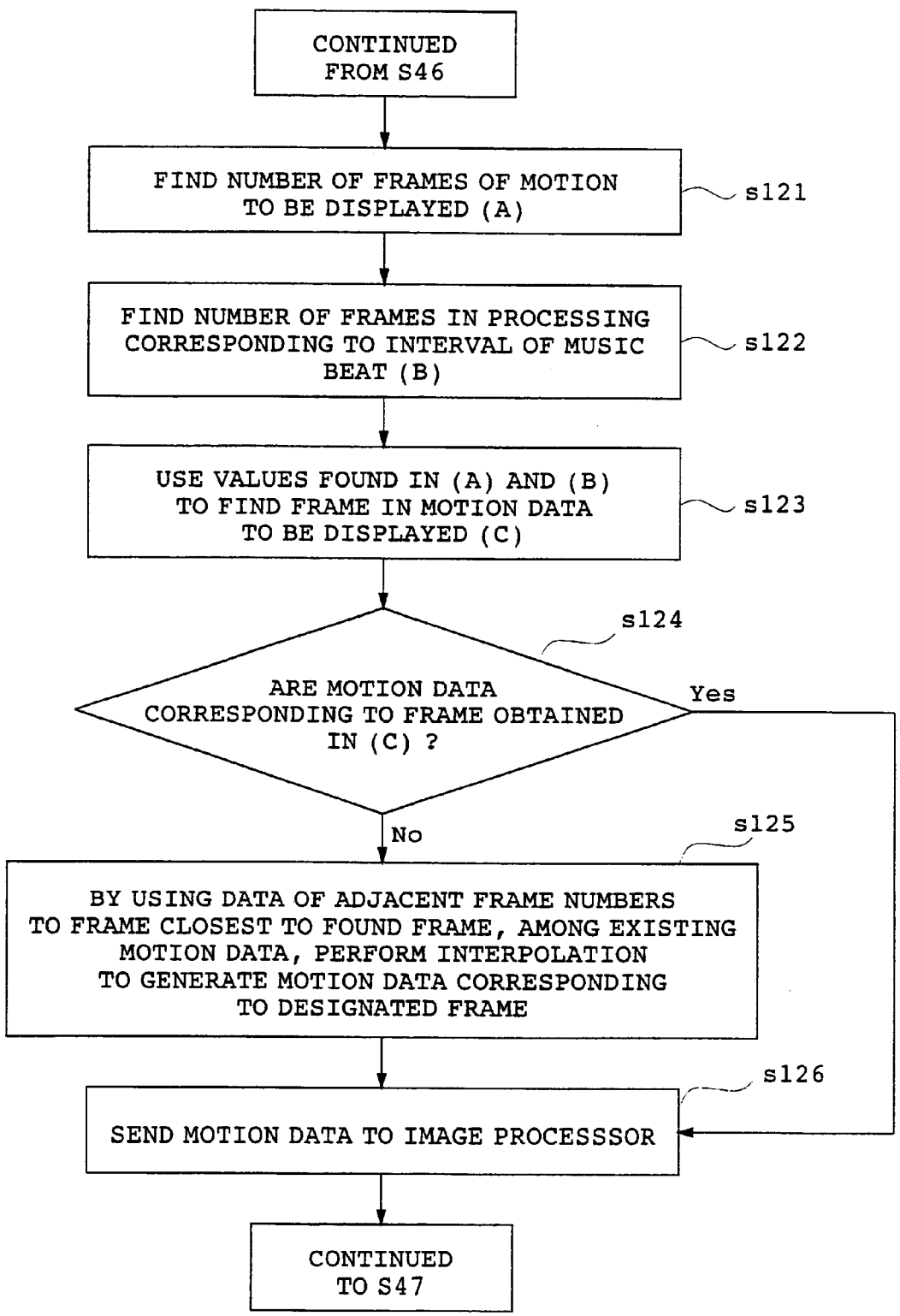
FIG. 37 is a flowchart of a program for interpolating dance motions in time with rhythms.

Also in the case where the rhythm of the music extracted from the music CD differs from the rhythm of the prepared music, there may be no motion data of a dance corresponding to the frame to be displayed. The flow of a program for interpolating the dance motion in time with the rhythm is shown in FIG. 37.

Initially, the number of frames to be displayed (how many frames constitute the actual motion) is found (s121). The program finds the number of frames to which the interval of the music being played corresponds (s122). From these values, the frame number of the dance motion to be displayed, which corresponds to the desired frame number for display, is found (s123). Specifically, for example, in the case where the dance motion to be displayed consists of 60 frames per rhythm, and the rhythm interval of the music being played is 45 frames, when the 10th frame is the desired frame, the (60/45 (10=13.33 . . . )-th frame is displayed.

It is determined whether there are motion data corresponding to the frame number found in step S123 (Specifically, whether the found frame number includes places of decimals) (s124). If there are (no places of decimals are included), the corresponding motion data are sent to the image processor (s125).

If there are not (places of decimals are included), among the existing motion data, data of adjacent frame numbers (the 13th frame and the 14th frame) to the frame closest to the found frame are used to generate motion data corresponding to the frame number found by interpolation (s126), and the generated data are sent to the image processor.

The above-described processes are performed between steps S46 and s47 described using FIG. 17.

In addition, by using a device with a vibrator (generator) unit as a controller, vibration is generated in key-operation timing for command inputting or when command inputting fails, whereby an instruction and warning can be given to the player.

Figure 38:
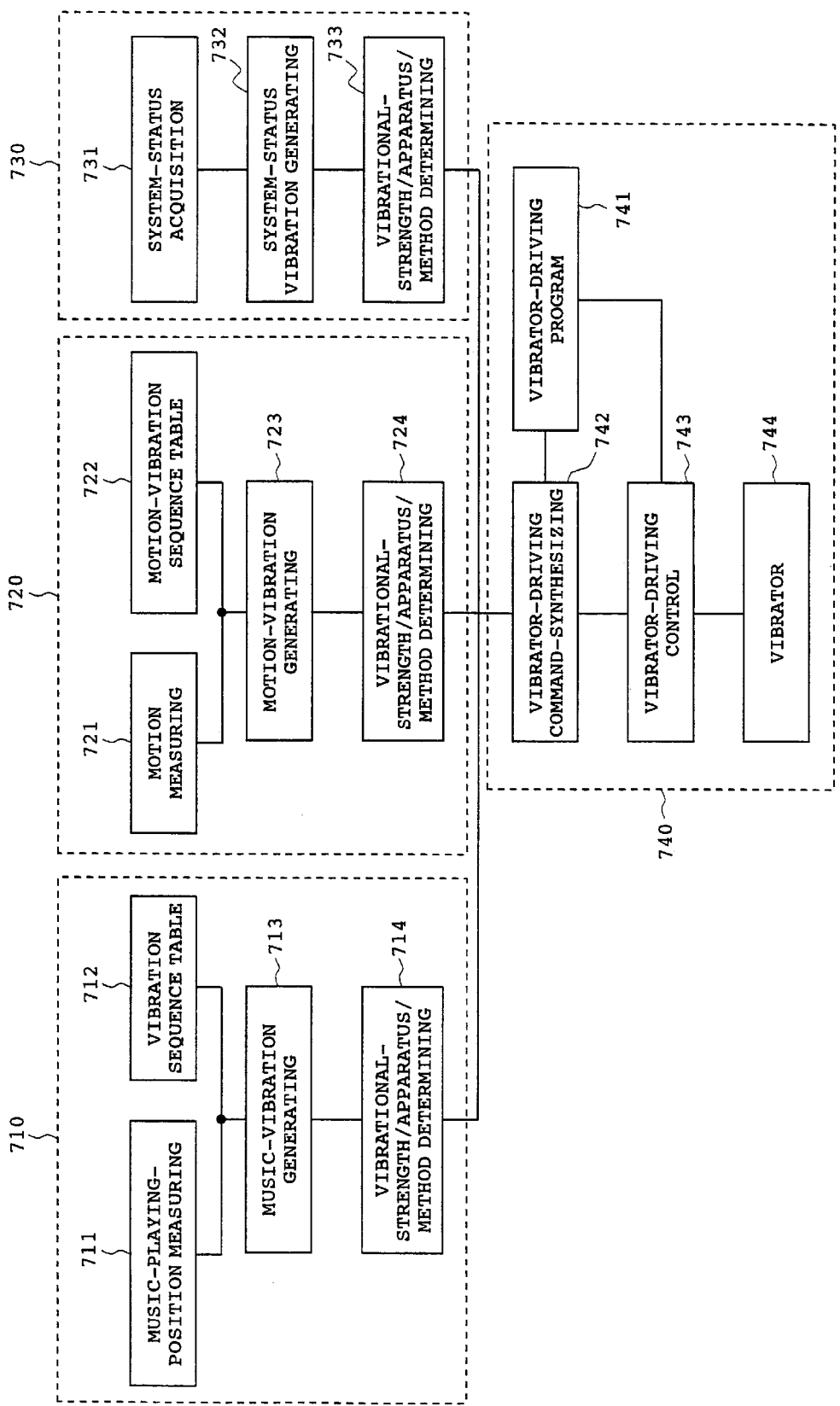
FIG. 38 is a block diagram of the control system of a vibrator.

FIG. 38 shows the structure of the control system of a vibration unit, which includes a music-vibration-command generator 710, a motion-vibration-command generator 720, a system-status-vibration-command generator 730, and a main vibrator unit 740.

The music-vibration-command generator 710 includes a music-playing-position measuring means 711, a vibration sequence table 712 describing what type of vibration should be generated in what position of the music, a music-vibration generating means 713 for generating, based on the playing position measured by the music-playing-position measuring means 711, vibration-control information at the present time from the vibration sequence table 712, and a vibrational-strength/apparatus/method determining means 714, and generates vibration commands corresponding to playing positions of the music, such as key-operation timing for command inputting.

The motion-vibration-command generator 720 includes a motion measuring means 721 for measuring the progress of the motion, a motion-vibration sequence table 722 describing what type of vibration should be generated in what position of the motion, a motion vibration generating means 723 for generating, based on the progress measured by the motion measuring means 721, vibration control information at the present time, and a vibrational-strength/apparatus/method determining means 724, and generates vibration commands corresponding to the progress of the motion.

The system-status-vibration-command generator 730 includes a system-status acquisition means 731 for acquiring information the status of the system, a system-status vibration generating means 732 for vibration control information from the information acquired by the system-status acquisition means 731, and a vibrational-strength/apparatus/method determining means 733 for generating vibration commands from the vibration control information. The system-status-vibration-command generator 730 generates vibration generates vibration commands according to system status such as failure in command inputting.

The main vibrator unit 740 includes a vibrator-driving program 741 holding a future program for driving the vibrator, a vibrator-driving command-synthesizing means 742 that performs the steps of receiving vibration commands from the vibration-command generators 710 to 730, comparing the received commands in strength and time with vibration conditions (vibration information at the present time and future vibration program), and updating the contents of the vibrator-driving program 741 as required, a vibrator-driving control means 743 for controlling, based on the contents of the vibrator-driving program 741, the driving of the vibrator in consideration of types and characteristics of usable vibrator, power consumption and usable capacity, and psychological effects of vibration, etc., and a vibrator 744 provided in the controller 2, the driving of which is controlled by the vibrator-driving control means 743.

Figure 39:
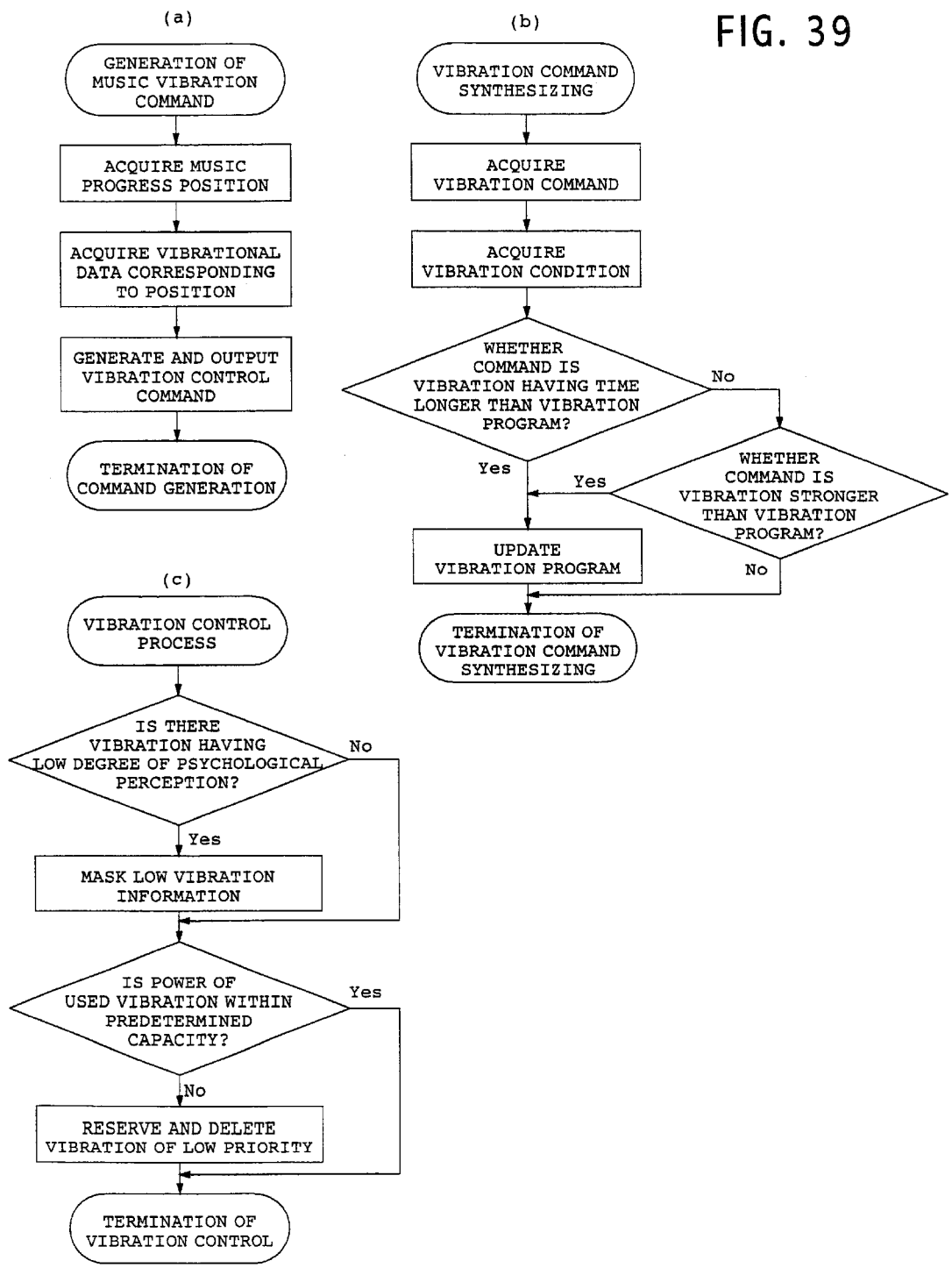
FIG. 39 consists of flowcharts (a), (b) and (c) showing programs for the control system of the vibrator.

FIG. 39(*a*) shows the flow of a program of a music vibration command generating process, FIG. 39(*b*) shows the flow of a program of a vibration command synthesizing process, and FIG. 39(*c*) shows the flow of a program of a vibrator-driving control process.

The case where the present invention is applied to a home game machine has been described, but it is clear that the present invention can be applied to commercial game machines, etc., installed in game amusement arcades and amusement facilities.

What is claimed is:

1. A method of controlling a video game designed for enabling a player to determine a behavior of a character on a video screen, said method comprising the steps of:

determining, by said player, a behavioral factor associated with a dance performed in time with music; and
   evaluating the dance,
   wherein when a multiple rhythm of a least rhythm in the music is used as a timing for performing key operation on the dance command, rhythms are extracted from said music, and among the extracted rhythms, the timing of the rhythm closest to the timing of the key operation by said player is set as the starting point of said multiple rhythm.

2. A method of controlling a video game according to claim 1, wherein the progress of the game is controlled by said evaluating step.

3. A method of controlling a video game according to claim 1, wherein said dance comprises a combination of short segments of a plurality of dance types.

4. A method of controlling a video game according to claim 3, wherein one action is executed when a predetermined dance command is input.

5. A method of controlling a video game according to claim 4, wherein predetermined-dance-command inputting is performed with a controller having keys of a plurality of types by operating the same or different type of keys or more times in predetermined order, simultaneously operating at least two types, operating the same key for not less than predetermined time, or arbitrarily these operations.

6. A method of controlling a video game according to claim 4, wherein, if one predetermined dance command is input, a determination action is made based on character condition that said predetermined dance command fails and no action is executed.

7. A method of controlling a video game according to claim 6, wherein the character condition comprises the condition of said character at the time of said dance command input and the motion of said character at the time of said dance command input.

8. A method of controlling a video game according to claim 4, wherein the evaluation of said dance is performed by determining whether or not dance-command inputting is in time with the rhythm of music.

9. A method of controlling a video game according to claim 8, wherein the evaluation of said dance is performed such that, as the difference between timing of dance-command formation and the accent of the rhythm of the music decreases, a higher score is given.

10. A method of controlling a video game according to claim 8, wherein the evaluation of said dance is performed such that a score is reduced if command inputting fails or if command inputting is not performed for at least a predetermined time.

11. A method of controlling a video game according to claim 8, wherein the evaluation of said dance is performed such that an additional score is given if the inputting of a command having a high level of difficulty succeeds, successive actions succeed, a composite action is performed, no failure in command inputting is detected for at least a predetermined time, and the connection between actions is preferable.

12. A method of controlling a video game according to claim 1, wherein arbitrary music other than music prepared as dance music is used.

13. A method of controlling a video game according to claim 1, wherein a camera perspective position and a light adjustment as to dance performed just before the present dance, or stored dance, are edited and stored.

14. A method of controlling a video game according to claim 1, wherein a character displayed using 3-D polygons is used for said character.

15. A method of controlling a video game according to claim 12, further including:
if motion data of a frame to be displayed is not found, generating interpolation data from motion data of adjacent frames, in response to the rhythms of the prepared music, and displaying the interpolation data.

16. A method of controlling a video game according to claim 5, further including generating vibrations when timing inputting for key operation for command inputting, or command inputting, fails.

17. A method of controlling a video game according to claim 1, further comprising the step of:
presenting said dance evaluation to the player.

18. A video game machine for enabling a player to determine a behavior of a character on a video screen, said video game machine comprising:
a controller for determining, by a player, a behavior of a character on a video screen performed in time with music;
a video screen for displaying the behavior of the character and behavior-caused effects of the character; and
a processor for dancing said character on said video screen in accordance with input from a player using said controller and for evaluating the dance of said character,
wherein when a multiple rhythm of a least rhythm in the music is used as a timing for performing key operation on the dance command, rhythms are extracted from said music, and among the extracted rhythms, the timing of the rhythm closest to the timing of the key operation by said player is set as the starting point of said multiple rhythm.

19. A video game machine according to claim 18, wherein said controller controls the progress of a game in accordance with the evaluation of the dance by said processor.

20. A video game machine according to claim 18, wherein said processor is arranged for executing one action constituting the dance in response to a predetermined dance command being input by the player using said controller.

21. A video game machine according to claim 20, wherein said controller includes keys of a plurality of types, and said processor being arranged for determining that a predetermined command has been input in response to (a) the same or different type of keys being operated twice or more times in a predetermined order, (b) at least two types of keys being simultaneously operated, (c) the same key being operated for at least a predetermined time, or (d) at least two of operations (a), (b) and (c) are arbitrarily combined and said processor determines that a predetermined command has been input.

22. A video game machine according to claim 20, wherein said processor, upon receiving a predetermined dance command, determines based on character condition that said predetermined dance command fails and executes no action.

23. A video game machine according to claim 18, wherein said processor is arranged for evaluating said dance with a score based on whether or not dance-command inputting from said controller in response to the player determinations is in time with the rhythm of music.

24. A video game machine according to claim 23, wherein said processor is arranged for evaluating the dance to provide the dance with a higher score in response to decreases in the difference between timing of dance-command formation and the accent of the rhythm of said music.

25. A video game machine according to claim 23, wherein said processor is arranged for reducing the evaluated score of the dance in response to a command inputting failing, and no command is input for at least a predetermined time.

26. A video game machine according to claim 23, wherein said processor is arranged for increasing the evaluated score by an additional score in response to (a) inputting a command having a high level of difficulty succeeding, (b) successive actions succeeding, (c) a composite action being performed, (d) no failure in command inputting being detected for at least a predetermined time, and (e) establishing preferable connections between actions.

27. A video game machine according to claim 18, further including a recorded music player for using arbitrary music other than music prepared as dance music.

28. A video game machine according to claim 18, wherein said processor is arranged for editing and storing a camera perspective position and a light adjustment as to a dance performed just before a presently performed dance, or a stored dance.

29. A video game machine according to claim 18, further including an image processor for controlling a character displayed using 3-D polygons.

30. A video game machine according to claim 18, wherein said processor includes presenting the dance evaluation to the player.

31. A computer-readable medium having computer-executable instructions for enabling a player to determine a behavior of a character on a video screen, the medium storing signals for enabling:

said player to determine, a behavioral factor associated with a dance performed in time with music; and the dance to be evaluated, wherein when a multiple rhythm of a least rhythm in the music is used as a timing for performing key operation on the dance command, rhythms are extracted from said music, and among the extracted rhythms, the timing of the rhythm closest to the timing of the key operation by said player is set as the starting point of said multiple rhythm.

32. A medium according to claim 31, wherein the progress of the game is controlled in accordance with the evaluation of said dance.

33. A medium according to claim 31, further comprising presenting said evaluation to the player.

\* \* \* \* \*